United States Patent [19]

Kanno et al.

[11] Patent Number: 6,084,988
[45] Date of Patent: *Jul. 4, 2000

[54] IMAGE PROCESSING APPARATUS

[75] Inventors: Hiroki Kanno; Gururaj Rao, both of Yokohama, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/800,508

[22] Filed: Feb. 14, 1997

[30] Foreign Application Priority Data

Feb. 19, 1996 [JP] Japan .................................. 8-030429

[51] Int. Cl.[7] .................................................. G06K 9/36
[52] U.S. Cl. ........................ 382/289; 382/284; 382/296; 358/450
[58] Field of Search ..................................... 382/276, 284, 382/289, 290, 293, 294, 296, 297; 358/448, 450

[56] References Cited

U.S. PATENT DOCUMENTS

| | | | |
|---|---|---|---|
| 5,077,811 | 12/1991 | Onda | 382/46 |
| 5,452,374 | 9/1995 | Cullen et al. | 382/293 |
| 5,461,459 | 10/1995 | Muramatsu et al. | 355/203 |
| 5,508,810 | 4/1996 | Sato | 382/294 |
| 5,530,560 | 6/1996 | Nakajima | 358/453 |
| 5,694,486 | 12/1997 | Shigeeda et al. | 358/450 |

FOREIGN PATENT DOCUMENTS

| | | |
|---|---|---|
| 0 255 942 | 2/1988 | European Pat. Off. . |
| 0 608 685 | 8/1994 | European Pat. Off. . |
| 7-245693 | 9/1995 | Japan . |

OTHER PUBLICATIONS

Wong et al., "Document Analysis System", IBM J. Res. Develop., vol. 26, No. 6, pp. 647–656, Nov. 1982.

Primary Examiner—Thomas D. Lee
Attorney, Agent, or Firm—Foley & Lardner

[57] ABSTRACT

Black pixels of image signals are expanded, a plurality of black pixel regions obtained by expanding the black pixels are connected to each other, and the circumscribing rectangles of the connected regions are extracted. In accordance with characteristics of the positions and sizes of the extracted circumscribing rectangles and the direction of characters in the circumscribing rectangles, whether the direction of the image is longitudinal or lateral and whether the image faces upwards or downwards are determined. In accordance with a result of the determination, configuration of the plural original document images on a sheet is decided. The plural original documents are combined into one composite image with the decided configuration. Therefore, a required copy output can be obtained regardless of the direction of the original document employed by a user and the direction of the original document set by the same.

12 Claims, 20 Drawing Sheets

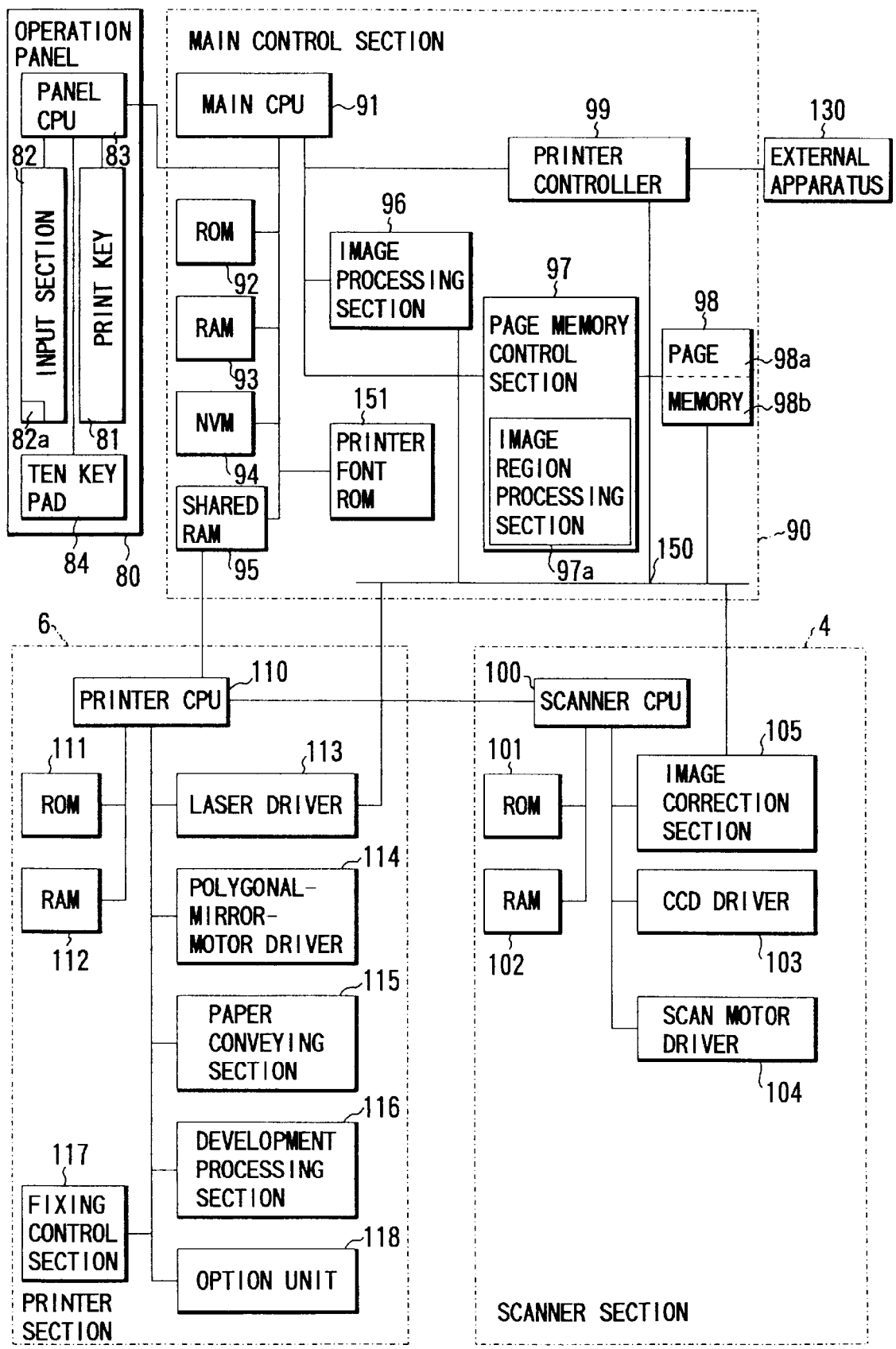
F I G. 2

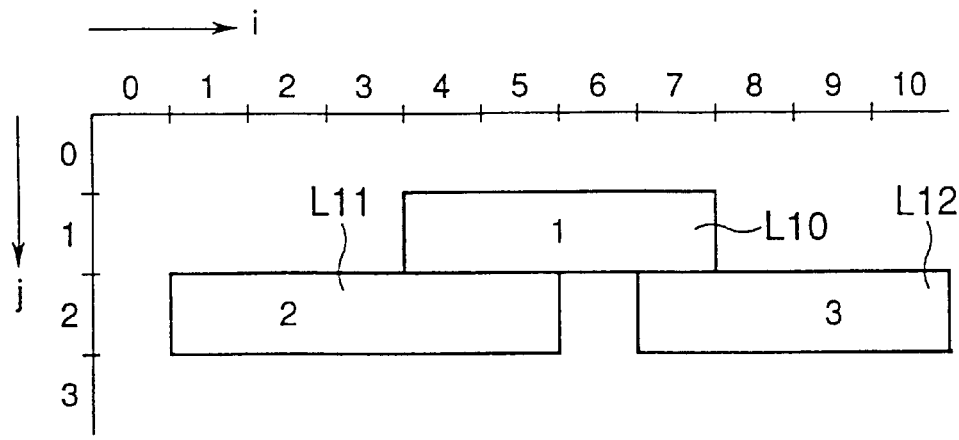
FIG. 11A
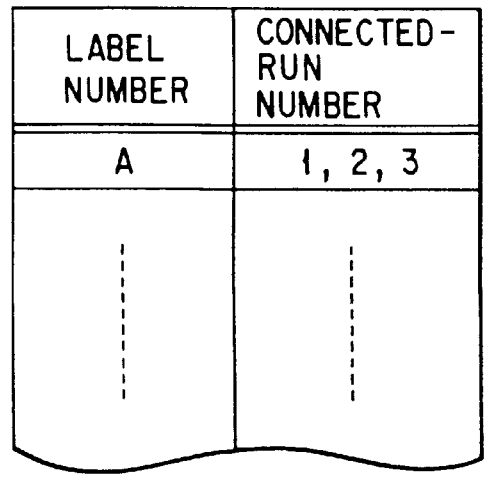
FIG. 11B
FIG. 12

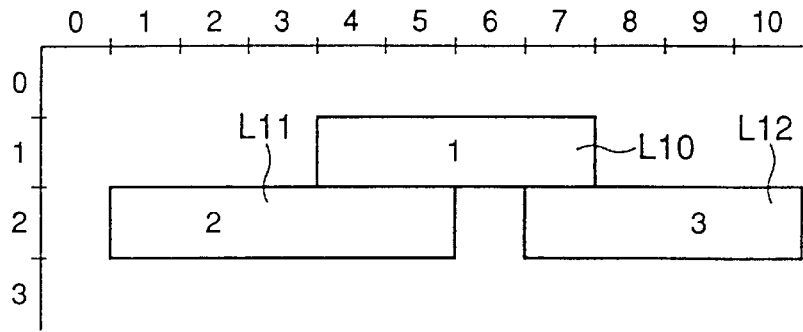
FIG. 13A
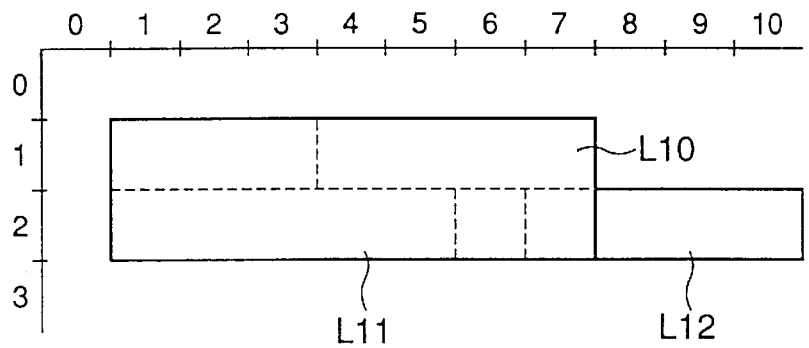
FIG. 13B
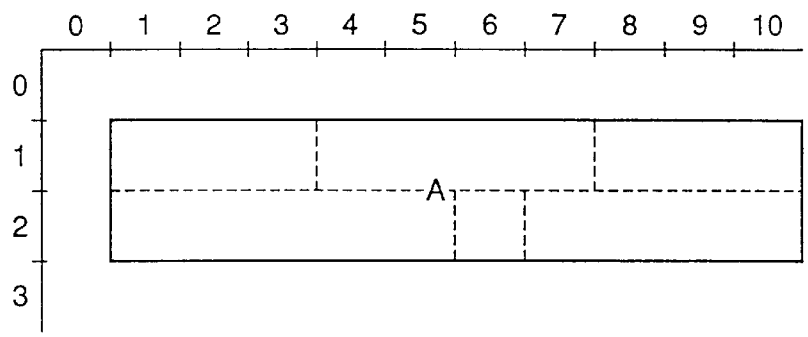
FIG. 13C
| LABEL NUMBER | START POINT | | SIZE | |
|---|---|---|---|---|
| | xs | ys | xl | yl |
| A | 1 | 1 | 9 | 2 |
| | | | | |
FIG. 14

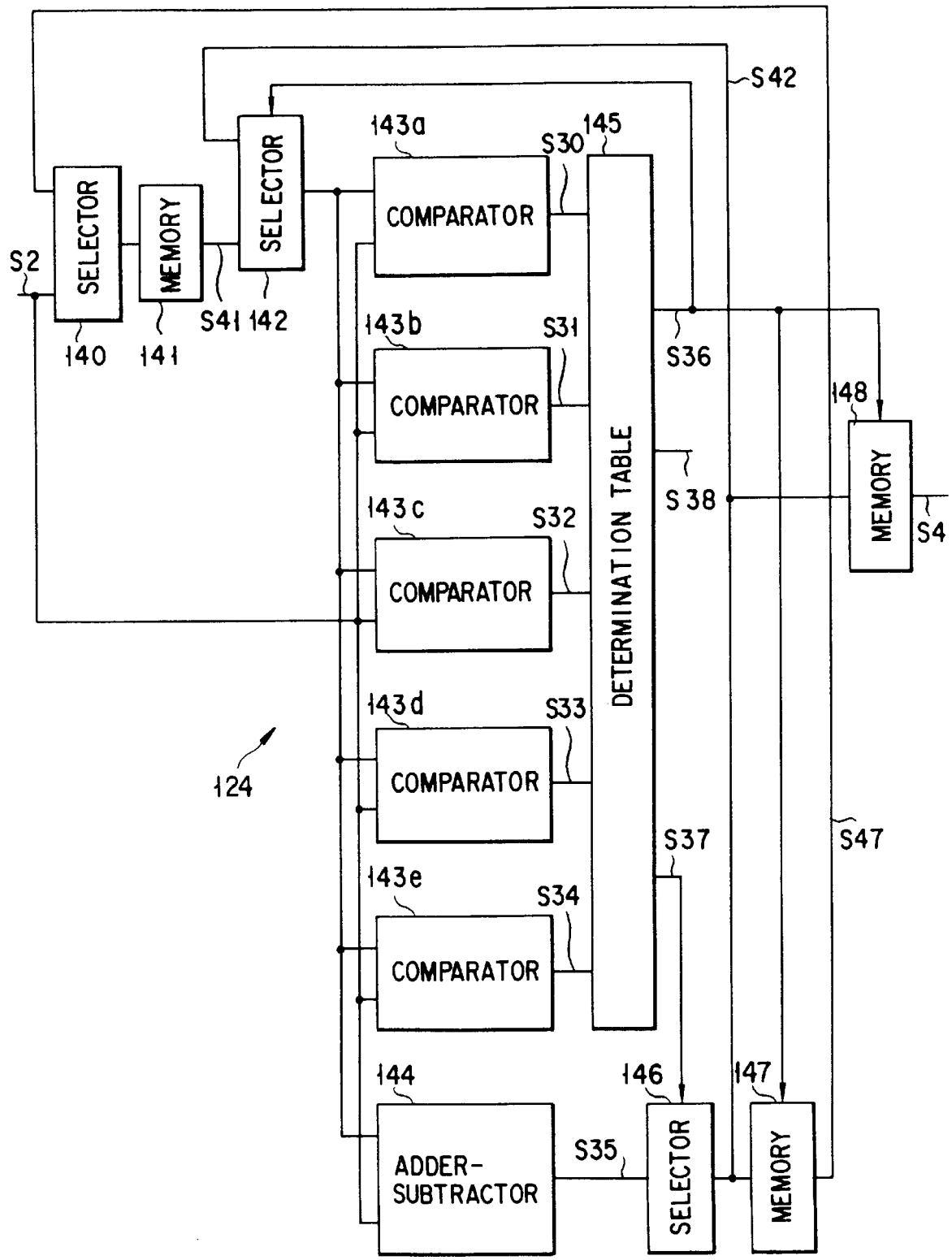
F I G. 16

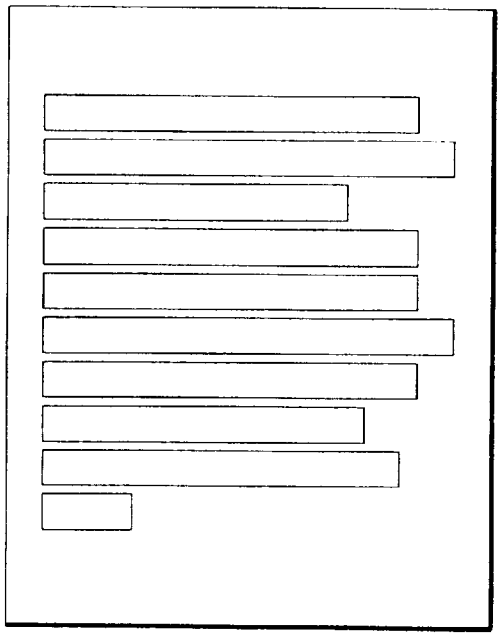

FIG. 17A

THE PRESENT INVENTION
RELATES TO AN APPARATUS
FOR DETECTING THE
DIRECTION OF AN IMAGE.
THE PRESENT INVENTION
RELATES TO AN APPARATUS
FOR ROTATING AN IMAGE
IN ACCORDANCE WITH
THE DIRECTION OF THE
IMAGE.

FIG. 17B

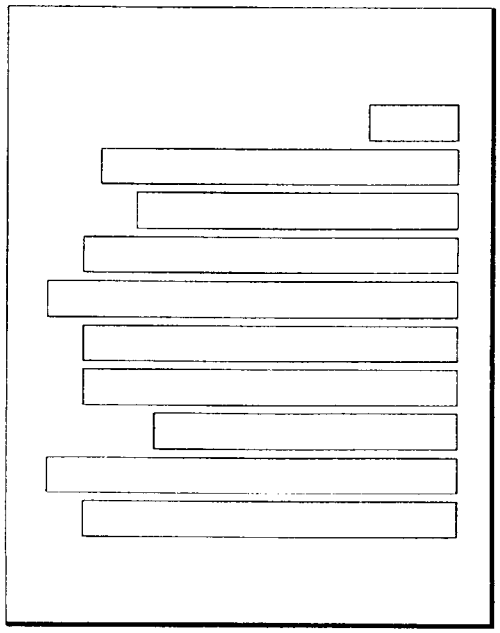

FIG. 18A

IMAGE.
THE DIRECTION OF THE
IN ACCORDANCE WITH
FOR ROTATING AN IMAGE
RELATES TO AN APPARATUS
THE PRESENT INVENTION
DIRECTION OF AN IMAGE.
FOR DETECTING THE
RELATES TO AN APPARATUS
THE PRESENT INVENTION

FIG. 18B

FIRST SHEET     SECOND SHEET     THIRD SHEET     FOURTH SHEET

| A | B | C | D |

SYNTHESIZED IMAGE

| A | B |
| C | D |

FIRST SHEET     SECOND SHEET     THIRD SHEET     FOURTH SHEET

| A | B | C | D |

SYNTHESIZED IMAGE

| B | D |
| A | C |

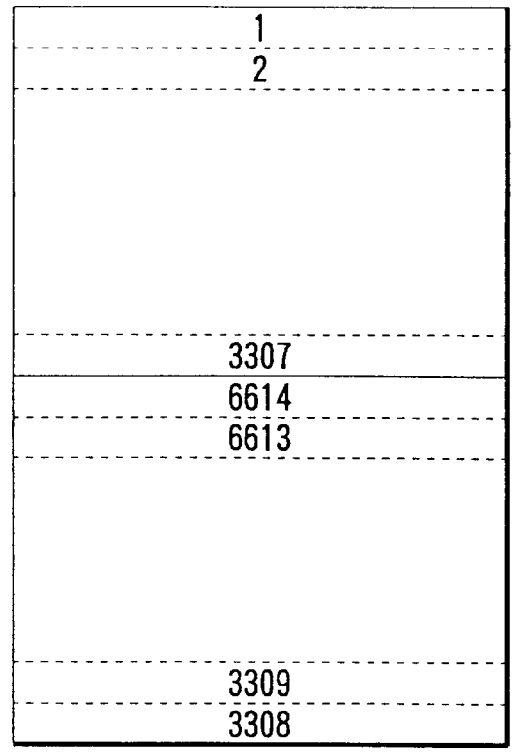
FIG. 32
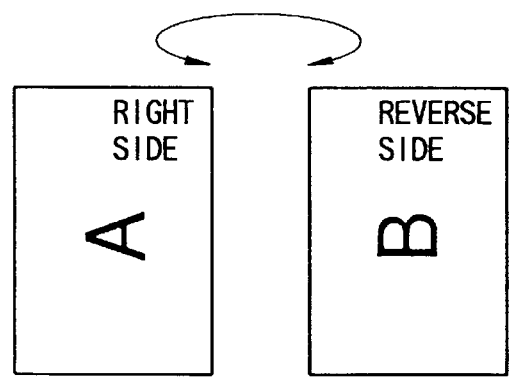
FIG. 33
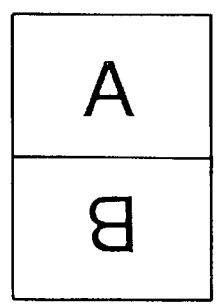 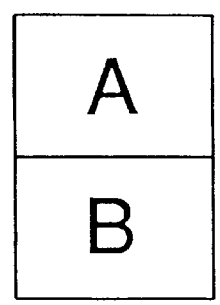
FIG. 34A          FIG. 34B

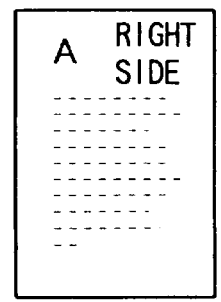 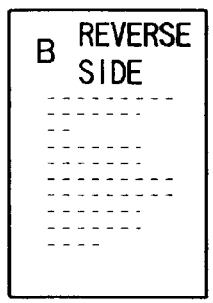 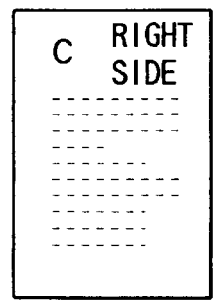 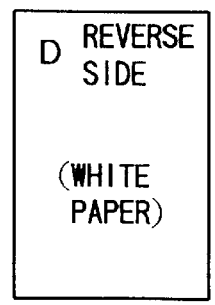
FIG. 35A         FIG. 35B
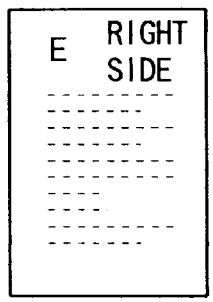 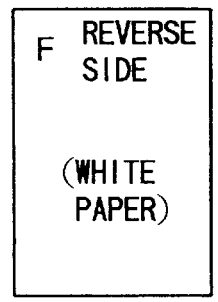
FIG. 35C
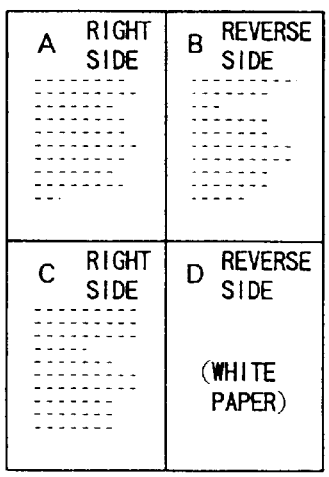 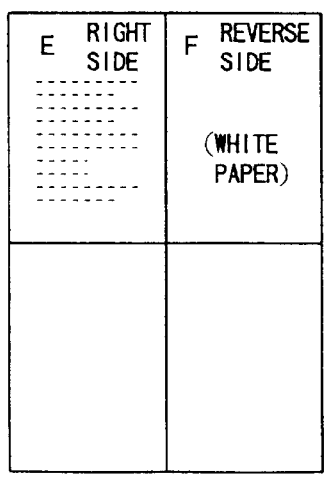 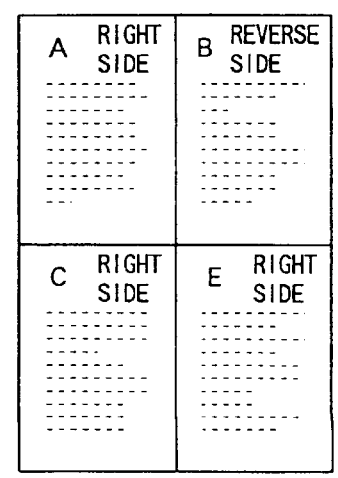
FIG. 36A         FIG. 36B         FIG. 36C

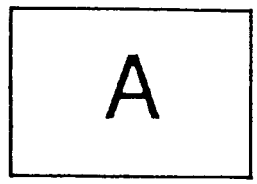
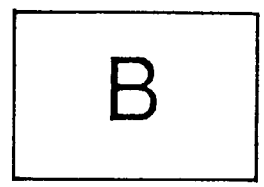
FIG. 41A    FIG. 41B
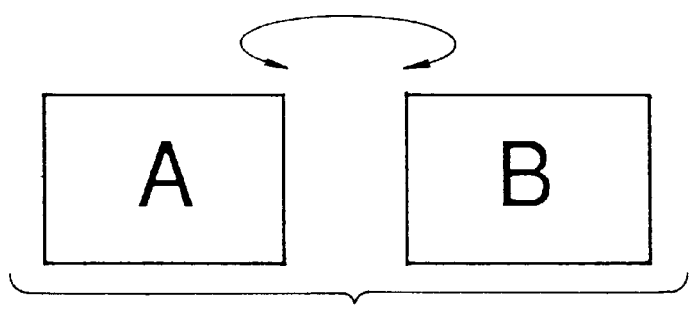
FIG. 42
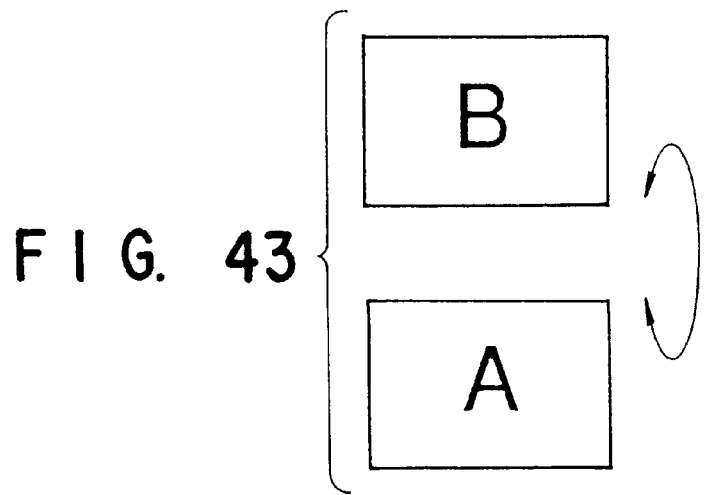
FIG. 43

IMAGE PROCESSING APPARATUS

BACKGROUND OF THE INVENTION

The present invention relates to an image processing apparatus for outputting copied images such that a plurality of original document sheets are recorded on either side of sheets by an OA (Office Automation) apparatuses, such as copying machines, or on both sides of one sheet.

In offices in recent years, PC (Personal Computers) and printers have been used widely and thus copied documents and paper documents have been increased.

On the other hand, attempts have been made to reduce the quantity of paper to solve one environmental problem, thus resulting in that regenerated paper and reverse sides of paper sheets being used and contrivance of contracting images of a plurality of original document sheets to combine and output the images onto one sheet being performed. Copying machines developed recently have a function of contracting images of a plurality of original document sheets to combine and output the images onto one sheet.

However, the conventional copying machines, having the function capable of contracting images of a plurality of original document sheets to combine and output the images onto one sheet, involve an unintentional fact that images cannot be formed in a required sequential order attributable to the direction of the original document whether the direction is longitudinal or lateral (landscape/portrait) or an error in setting the direction of the original document. In this case, the original document must be again set and the copying operation is required to be performed again.

When images of four sheets of original document written as shown in FIG. 21A such that characters "A", "B", "C" and "D" are respectively written are contracted so as to be combined and output onto one sheet by the above-mentioned function, the images of the four original document sheets are contracted and output, as shown in FIG. 21B. The above-mentioned function is realized by contracting the images of the read original document into one-fourth and forming the characters A, B, C and D shown in FIG. 21B in this order.

However, the above-mentioned situation is changed attributable to a fact whether the original document intended to be copied is a longitudinal document or a lateral document (landscape/portrait).

If images of four sheets of lateral original document written as shown in FIG. 24A such that characters "A", "B", "C" and "D" are respectively written are contracted so as to be combined and output onto one sheet by the above-mentioned function, the images are contracted and simply formed in the sequential order as A, B, C and D shown in FIG. 24B. Therefore, an output image is disordered as shown in FIG. 24B such that the characters are formed in an unexpected order.

That is, although the above-mentioned function enables a required copied image to be formed in which respective images are formed adequately if the original document is formed in the longitudinal direction, an additional function is required with which the lateral direction of the original document is instructed in the case where the original document is a lateral directional document and which is able to adequately change the forming order of the respective original document sheets.

Although a case where the function of contracting a plurality of original document sheets to combine and output the images into one sheet cannot be obtained has been described which takes place in the above-mentioned case in which (1) the original document is longitudinal/lateral. Moreover, the above-mentioned function cannot attain a required object attributable to (2) the vertical direction in which the original document is set;

(3) whether the image on the original document is written longitudinally or laterally;

(4) mixture of longitudinal original documents and lateral original document;

(5) mixture of original documents facing upwards and those facing downwards; and (6) inadequate direction of the paper sheet cassette which has been set.

In order to adequately use the above-mentioned function, a user must recognize the function and adequately set the original document or arrange the order of the original documents to be adaptable to the above-mentioned function or again perform the copying operation. However, if original documents are mixed as described in (4) and (5), the user must rearrange the direction of the original documents.

Also in a case where a plurality of original document sheets are copied to both sides of one output sheet, (7) the direction of the original document when the both-side copying operation is performed sometimes results in an unsatisfactory result being obtained.

As described above, when the function of contracting a plurality of original document sheets to combine and output the images onto one sheet or a double-side output function is used by the conventional copying machine, a required copy cannot be obtained in many cases attributable to the direction of the original document whether the image is formed in the longitudinal direction or the lateral direction or the sides of the same whether the original document faces upwards or downwards and the direction of the paper sheet cassette. Erroneous use of the above-mentioned function provided for the purpose of improving the appearance of the copy and reducing the quantity of copying sheets raises a problem of inconvenience for a user or increase in the quantity of paper attributable to the required re-copying operation.

BRIEF SUMMARY OF THE INVENTION

An object of the present invention is to improve an image processing apparatus which has a function for contracting a plurality of original document sheet images to combine the images and output the images on one sheet or outputting the images on both sides of a sheet. Another object of the present invention is to provide an image processing apparatus capable of obtaining a required copy output regardless of the direction of an original document images employed by a user and a direction of an original document sheets set by the user.

In order to achieve the above object, according to one aspect of the present invention, there is provided an image processing apparatus for performing a predetermined process on images read from originals, thereby to form an output image, comprising: means for detecting the directions of a plurality of images read from originals when the images required to be combined are output on one image forming medium; and means for combining the plurality of images into a single composite image in accordance with a result of detection performed by the detection means, thereby to form an output image to be formed on the one image forming medium.

According to another aspect of the present invention, there is provided an image processing apparatus for performing a predetermined process on images read from originals, thereby to form an output image, comprising: means for binary-coding an image signal of a target pixel in an image required to be processed; means for expanding black pixels of the image signal binary-coded by the binary-coding means; means for connecting a plurality of black pixel regions obtained by expanding the black pixels by the expanding means; means for extracting the circumscribing rectangle of the regions connected by the connection means; means for determining the direction of an image in accordance with the characteristics of the position and the size of the circumscribing rectangle and the direction of characters in the circumscribing rectangle extracted by the circumscribing-rectangle extracting means; and image combining means for orienting the plurality of images in the same direction in accordance with a result of detection performed by the detection means and combining the plurality of images into one composite image.

Black pixels of image signals are expanded, a plurality of black pixel regions obtained by expanding the black pixels are connected to each other, and the circumscribing rectangles of the connected regions are extracted. In accordance with characteristics of the positions and sizes of the extracted circumscribing rectangles and the direction of characters in the circumscribing rectangles, whether the direction of the image is longitudinal or lateral and whether the image faces upwards or downwards are determined. In accordance with a result of the determination, configuration of the plural original document images on a sheet is decided. The plural original documents are combined into one composite image with the decided configuration. Therefore, a required copy output can be obtained regardless of the direction of the original document employed by a user and the direction of the original document set by the same.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing the schematic structure of the digital copying machine for explaining an embodiment of the present invention;

FIGS. 11A and 11B are diagrams showing a specific example of run in the run expansion process and an example of stored run information;

FIG. 12 is a diagram showing an example of stored labeling information;

FIGS. 13A to 13C are diagrams showing the principle of a method of extracting a circumscribing rectangle;

FIG. 14 is a diagram showing an example of stored information for extracting a circumscribing rectangle;

FIG. 16 is a block diagram showing a specific example of the structure of a circuit for forming the labeling means and the circumscribing rectangle extracting means;

FIGS. 17A and 17B are diagrams showing a method of determining whether or not the original document faces upwards or downwards;

FIGS. 18A and 18B are diagrams showing a method of determining whether or not the original document faces upwards or downwards;

FIG. 32 is a diagram showing an example of stored composite image data in the image combining region;

FIG. 33 is a diagram showing an example of an image of an original document;

FIGS. 34A and 34B are diagrams showing examples of composite images;

FIGS. 35A to 35C are diagrams showing examples of images of original documents;

FIGS. 36A to 36C are diagrams showing examples of the image of the original document;

FIGS. 41A and 41B are diagrams showing examples of images of original documents;

FIG. 42 is a diagram showing an example of a copied image; and

FIG. 43 is a diagram showing an example of the copied image.

DETAILED DESCRIPTION OF THE INVENTION

An embodiment of the present invention will now be described with reference to the drawings.

Figure 1:
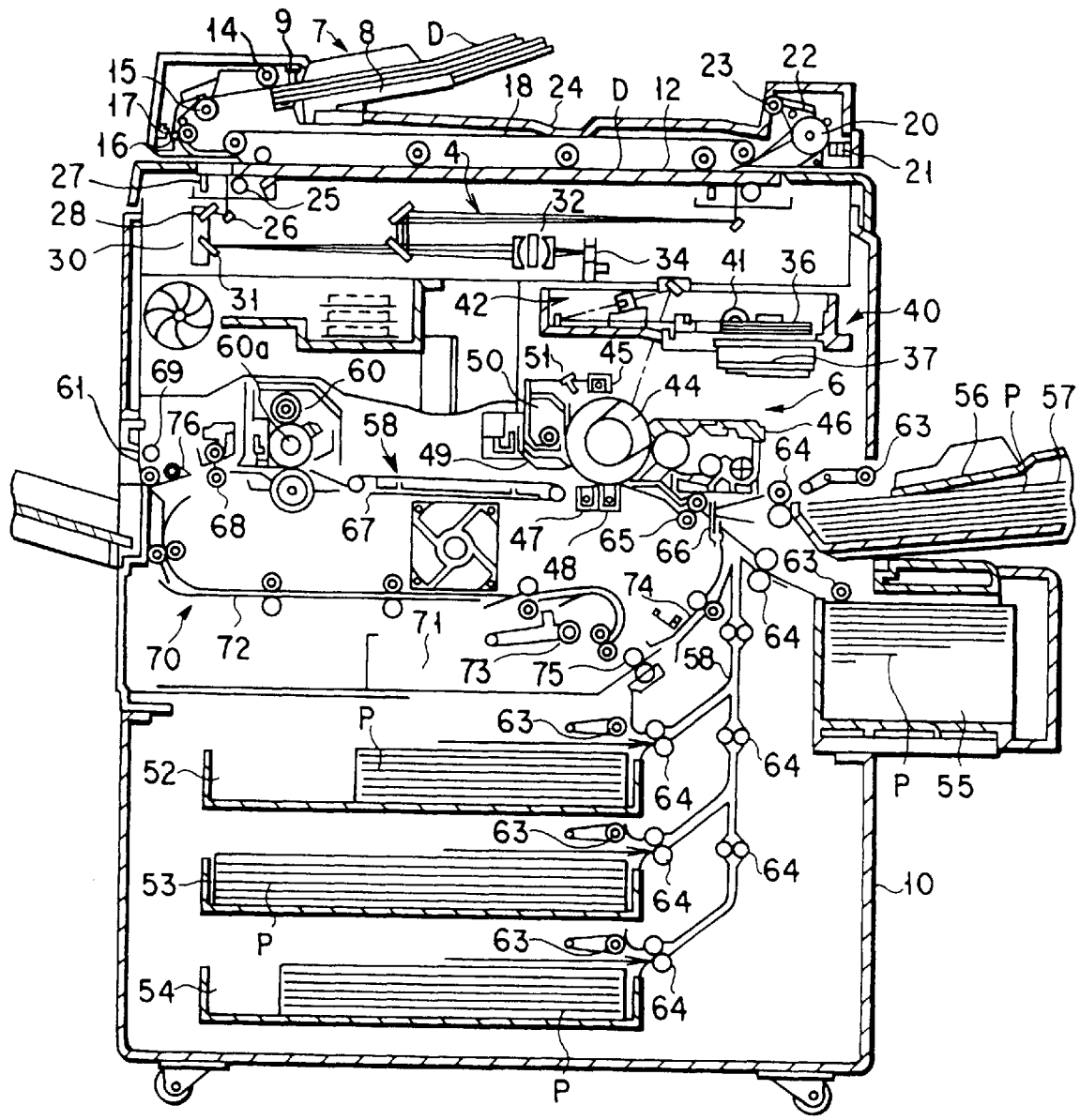
FIG. 1 is a schematic view showing the structure of a digital copying machine.

FIG. 1 is a schematic view showing the internal structure of a digital copying machine having a function of printing data supplied from an external unit (a personal computer or the like) and serving as an image processing apparatus according to the present invention.

As shown in FIG. 1, the digital copying machine has a apparatus body 10. The apparatus body 10 includes a scanner section 4 serving as a reading means (an image input section) and a printer section 6 serving as an image forming means (an image recording section), which will be described later.

An original-document retainer 12, comprising a transparent glass plate on which original document D having an image, to be read, that is, to be processed, is placed, is formed on the top surface of the apparatus body 10. An automatic document feeder (hereinafter called as an "ADF") 7 for automatically feeding the original document onto the original-document retainer 12 is disposed on the top surface of the apparatus body 10. The disposed ADF 7 can be opened and closed with respect to the original-document retainer 12 so as to as well as serve as a document retainer for bringing the original document D placed on the original-document retainer 12 into close contact with the surface of the original-document retainer 12.

The ADF 7 has an original-document tray 8 in which the original document D is set, an empty sensor 9 for detecting whether or not an original document exists, a pickup roller 14 for sequentially taking the original document sheets from the original-document tray 8, a paper supply roller 15 for conveying the taken original document, an aligning roller pair 16 for aligning the leading ends of the original document sheets, a size sensor 17 for detecting the size of the original document D and a conveying belt 18 disposed to substantially cover the overall body of the original-document retainer 12. A plurality of the original document sheets upwardly set in the original-document tray 8 are sequentially taken out such that the uppermost sheet is first taken out, and then aligned by the aligning roller pair 16. Then, the original document is conveyed to a predetermined position in the original-document retainer 12 by the conveying belt 18.

In the ADF 7, an inversion roller 20, a non-inversion sensor 21, a flapper 22 and a sheet discharge roller 23 are disposed in an end portion opposite to the aligning roller pair 16 while interposing the conveying belt 18. The original document D, the image information of which has been read by a scanner section 4, to be described later, is fed from the top surface of the original-document retainer 12 by the conveying belt 18. Then, the original document D is discharged to the upper surface of an original-document discharge section 24 on the top surface of the ADF 7 through the inversion roller 20, the non-inversion sensor 21 and the flapper 22. When the reverse side of the original document D is read, the flapper 22 is switched so that the original document D, which has been conveyed by the conveying belt 18, is inverted by the inversion roller 20. Then, the original document D is again conveyed to the predetermined position on the original-document retainer 12 by the conveying belt 18.

The scanner section 4 disposed in the apparatus body 10 has an exposure lamp 25 serving as a light source for irradiating the original document D placed on the original-document retainer 12 with light; and a first mirror 26 for deflecting light reflected by the original document D into a predetermined direction. The exposure lamp 25 and the first mirror 26 are attached to a first carriage 27 disposed below the original-document retainer 12.

The first carriage 27 is disposed to be movable in parallel to the original-document retainer 12, the first carriage 27 being reciprocated below the original-document retainer 12 by a drive motor through a toothed belt or the like (not shown).

A second carriage 28 capable of moving in parallel to the original-document retainer 12 is disposed below the original-document retainer 12. Second and third mirrors 30 and 31 for sequentially deflecting light reflected by the original document D and deflected by the first mirror 26 are attached to the second carriage 28 such that the second and third mirrors 30 and 31 are disposed perpendicular to each other. The second carriage 28 follows the operation of the first carriage 27 by the toothed belt or the like for moving the first carriage 27. Moreover, the second carriage 28 is moved in parallel to the original-document retainer 12 at speed which is half of the speed of the first carriage 27.

An image forming lens 32 for converging light reflected by the third mirror 31 on the second carriage 28 and a CCD sensor 34 for receiving and photo-electrically converting reflected light converged by the image forming lens 32 are disposed below the original-document retainer 12. The image forming lens 32 is, through a drive mechanism, movably disposed in a plane including the optical axis of light deflected by the third mirror 31 to move so as to image reflected light with a required magnification. The CCD sensor 34 photoelectrically converts incidental reflected light to transmit an electric signal corresponding to the read original document D. That is, the CCD sensor 34 converts light emitted from the light source and reflected from the original document into an electric signal for each unit pixel obtained by longitudinally and laterally dividing the image of the original document so as to transmit 8-bit digital data for each pixel.

On the other hand, the printer section 6 is provided with a laser exposure section 40 serving as a latent image forming means. The laser exposure section 40 has a semiconductor laser 41 serving as the light source, a polygonal mirror 36 serving as a scan member for successively deflecting laser beams emitted from the semiconductor laser 41, a polygon-mirror motor 37 serving as a scan motor for rotating the polygonal mirror 36 at a predetermined number of revolutions to be described later and an optical system 42 for deflecting the laser beam supplied from the polygonal mirror 36 to introduce the deflected laser beam into the surface of a photosensitive drum 44 to be described later. The laser exposure section 40 having the above-mentioned structure is secured and supported by a support frame (not shown) of the apparatus body 10.

The semiconductor laser 41 is controlled so as to be turned on or off in accordance with image information of the original document D read by the scanner section 4 or document information transmitted or received by a facsimile method. Laser beams emitted from the semiconductor laser 41 are allowed to pass through the polygonal mirror 36 and the optical system 42 to be allowed to propagate to the photosensitive drum 44. Thus, the outer surface of the photosensitive drum 44 is scanned so that a latent image is formed on the outer surface of the photosensitive drum 44.

The printer section 6 has the photosensitive drum 44 serving as an image carrier disposed in the substantially central portion of the apparatus body 10. The outer surface of the photosensitive drum 44 is exposed by the laser beam supplied from the laser exposure section 40 so that a required latent image is formed. The following elements are sequentially disposed around the photosensitive drum 44: an electrorifying charger 45 for electrically charging the outer surface of the photosensitive drum 44 to a predetermined charge level; a developing unit 46 for supplying toner serving as a developer to the latent image formed on the outer surface of the photosensitive drum 44 to develop the latent image with a required image density; a transfer charger 48 integrally comprising a separation charger 47 for separating a member, to which an image must be transferred, that is, copy sheet P, from the photosensitive drum 44 and arranged to transfer a toner image formed on the photosensitive drum 44 to the paper P; a separation claw 49 for separating the copy paper P from the outer surface of the photosensitive drum 44; a cleaning section 50 for cleaning up toner left on the outer surface of the photosensitive drum 44; and a destaticizer 51 for destaticizing the outer surface of the photosensitive drum 44.

An upper cassette 52, a middle cassette 53 and a lower cassette 54, each of which can be drawn from the apparatus body 10, are disposed in the lower portion of the apparatus body 10 in such a manner that the cassettes 52, 53 and 54 are disposed vertically. The cassettes 52, 53 and 54 respectively accommodate copy paper sheets having different sizes. A large-capacity feeder 55 is disposed on the side of the above-mentioned cassettes 52, 53 and 54. The large-capacity feeder 55 accommodates about 300 sheets of copy paper P having A4-size. A paper feeding cassette 57 also serving as a manual feeding tray 56 is detachably mounted above the large-capacity feeder 55.

The apparatus body 10 includes a conveying passage 58 extending from each cassette and the large-capacity feeder 55 to pass through a transferring section formed between the photosensitive drum 44 and the transfer charger 48. A fixing unit 60 is disposed at an end of the conveying passage 58. A discharge opening 61 is formed in the side wall of the apparatus body 10 facing the fixing unit 60. A sheet discharge tray 62 is inserted into the discharge opening 61.

A pickup roller 63 for sequentially taking out the copy paper P from any one of the cassettes 52, 53, 54 and 57 or the large-capacity feeder 55 is disposed adjacent to each of the cassettes 52, 53, 54 and 57. Moreover, a multiplicity of paper supply roller pairs 64 for conveying the copy paper P taken from the paper supply roller pair 64 through the conveying passage 58 are disposed in the conveying passage 58.

A resist roller pair 65 is disposed in the conveying passage 58 at a position upstream from the photosensitive drum 44. The resist roller pair 65 corrects inclination of the extracted copy paper P, aligns the leading end of the toner image on the photosensitive drum 44 and the leading end of the copy paper P and moves the copy paper P to the transferring section at the same speed as that of the outer surface of the photosensitive drum 44. A pre-alignment position sensor 66 for detecting the copy paper P which has been conveyed is disposed in front of the resist roller pair 65, that is, at a position adjacent to the paper supply roller pair 64.

The sheets of the copy paper P, which have been, one by one, taken out from each cassette or the large-capacity feeder 55 by the pickup roller 63, are conveyed to the resist roller pair 65 by the paper supply roller pair 64. Then, the leading end of the copy paper P is aligned by the resist roller pair 65, and then moved to the transferring section.

In the transferring section, a developed image formed on the photosensitive drum 44, that is, the toner image, is transferred to the upper surface of the copy paper P by the transfer charger 48. The copy paper P having the transferred toner image is separated from the outer surface of the photosensitive drum 44 attributable to the operation of the separation charger 47 and the separation claw 49, and then moved to the fixing unit 60 through a conveying belt 67 which forms a portion of the upper cassette 52. Then, the developed image is fused and fixed to the copy paper P by the fixing unit 60. Then, the copy paper P is allowed to pass through a discharge opening 61 so as to be discharged to the upper surface of the sheet discharge tray 62 by the paper supply roller pair 68 and the paper-discharge roller pair 69.

An automatic double-side unit 70 for inverting the copy paper P allowed to pass through the fixing unit 60 to again move the copy paper P to the resist roller pair 65 is disposed below the conveying passage 58. The automatic double-side unit 70 has a temporary accumulation section 71 for temporarily accumulating the copy paper P, an inversion passage 72 for inverting the copy paper P allowed to pass through the fixing unit 60 to introduce the copy paper P to the temporary accumulation section 71, a pickup roller 73 for, one by one, extracting the sheets of the copy paper P accumulated in the temporary accumulation section 71 and a paper supply roller 75 for moving the extracted paper to the resist roller pair 65 through the conveyance passage 74. A distribution gate 76 for selectively distributing the copy paper P to the discharge opening 61 or the inversion passage 72 is disposed at a branch portion between the conveying passage 58 and the inversion passage 72.

When the double-side copying operation is performed, the copy paper P allowed to pass through the fixing unit 60 is introduced into the inversion passage 72 by the distribution gate 76. Then, the inverted sheets of the copy paper P are temporarily accumulated in the temporary accumulation section 71, and then allowed to pass through the conveyance passage 74 so as to be moved to the resist roller pair 65 by the pickup roller 73 and the paper supply roller 75. Then, the copy paper P is aligned by the resist roller pair 65, and then the copy paper P is again moved to the transferring section so that the toner image is transferred to the reverse side of the copy paper P. Then, the copy paper P is allowed to pass through the conveying passage 58, the fixing unit 60 and the paper-discharge roller pair 69, and then discharged to the upper surface of the sheet discharge tray 62.

The digital copying machine further includes an operation panel 80 and a main control section 90 shown in FIG. 2.

The operation panel 80 has a print key 81 for instructing to start the copying operation, an input section 82 having a plurality of depression button switches or color cathode ray tube or a structure having a transparent touch-sensor panel formed on a liquid crystal screen in order to input conditions for the image output from the digital copying machine, for example, the number of copies or prints, the magnification or instruction of partial copying operation and the coordinates of the region of the partial copying operation, a panel CPU 83 for controlling the operation panel 80 and a ten-key pad 84 for use to set the number of copies and the magnification of the copy.

The input section 82 has a touch sensor arranged to correspond to the operation sequence of the digital copying machine or the conditions to be input, the input section 82 having, for example, icons, figures, characters or character strings to serve as a plurality of input keys. For example, a combination mode key and a soft key are provided for the input section 82. Moreover, the input section 82 has a display section 82a on which operation guide and input contents are displayed. As the combination mode key, there are provided a 4in1 mode key for copying four original document sheets on one copy paper P, a 2in1 mode key for copying two original document sheets on one copy paper P and a double-side mode key for copying two original document sheets on one copy paper P.

The display section 82a displays the number of copies, the copying magnification, copy permission, the memory capacity permitted for use in a sorting operation and the number (a measure) of sheets of original document which can be read with respect to the memory capacity.

Moreover, the display section 82a displays a message for causing a user to confirm the direction of the image or to determine whether or not the operation will be continued in accordance with a result of determination performed by a copy determining means 161, to be described later.

In response to the above-mentioned message, whether or not the operation will be continued is input by using the keys from the input section 82.

FIG. 2 is a block diagram schematically showing flow of signals for use in establishing the electrical connections in the digital copying machine and controlling the same shown in FIG. 1. Referring to FIG. 2, the digital copying machine has a main CPU 91 in a main control section 90, a scanner CPU 100 in the scanner section 4 and a printer CPU 110 in the printer section 6. The main CPU 91 holds bi-directional communication with the printer CPU 110 through a shared RAM 95. The main CPU 91 issues an instruction to perform the operation, while the printer CPU 110 returns a status of the apparatus. The printer CPU 110 and the scanner CPU 100 hold serial communication. The printer CPU 110 issues an instruction to perform the operation, while the scanner CPU 100 returns status of the apparatus.

The operation panel 80 is connected to the main CPU 91.

The main control section 90 is composed of the main CPU 91, the ROM 92, the RAM 93, a NVM 94, the shared RAM 95, an image processing section 96, a page memory control section 97, a page memory 98, a printer controller 99 and a printer font ROM 151.

The main CPU 91 controls the overall operations of the main control section 90. The ROM 92 stores a control program. The RAM 93 temporarily stores data.

The NVM (nonvolatile RAM) 94 is a nonvolatile memory backed up by a battery (not shown) and arranged to save data thereon when the electric power has been turned off.

The shared RAM 95 is arranged to hold bi-directional communication between the main CPU 91 and the printer CPU 110.

The main CPU 91 determines the reduction (or enlargement) ratio in accordance with the size of the original document, the size of the copy paper and the combination mode when the combination (print) mode has been employed. Then, the main CPU 91 reduces (or enlarges) the size of image data read by the scanner section 4 with the reduction (or the enlargement) ratio to store image data above in the buffer memory region 98a of the page memory 98.

The main CPU 91 determines whether the original document is a longitudinal document or a lateral document in accordance with an output from the size sensor 17. A result of the determination is arranged to be supplied to an image direction detection means 160.

Figure 3:
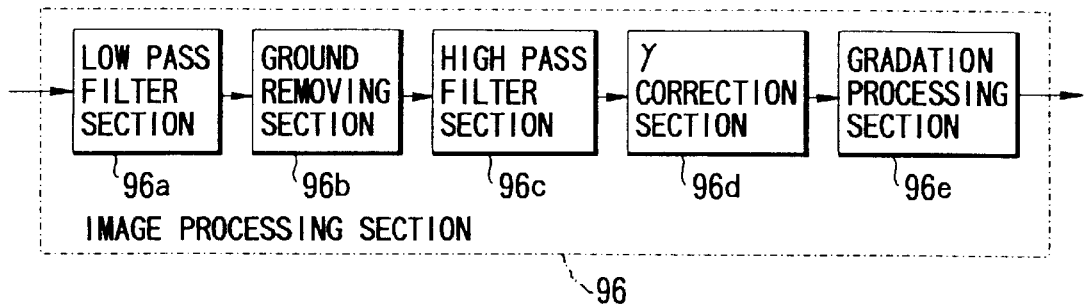
FIG. 3 is a block diagram showing the schematic structure of an image processing section.

The image processing section 96 is, as shown in FIG. 3, composed of a low pass filter section 96a for eliminating noise in the image, a ground removing section 96b for correcting the density of the ground of the image, a high pass filter section 96c for highlighting edges of the image, a γ-correction section 96d for correcting the recording density characteristic of the printer section 6 and a gradation processing section 96e for binary-coding an 8-bit signal while maintaining the gradient and the character gradient so as to convert the signal into a 1-bit signal.

The page memory control section 97 stores image data in the page memory 98 and read image data from the same. The page memory 98 has a region which is capable of storing image data for a plurality of pages, the page memory 98 being composed of a buffer memory region 98a, which is capable of storing image data for one page supplied from the scanner section 4 and an image combining region 98b which is capable of storing composite image data. The page memory control section 97 is provided with an image combination processing section 97a which is used when the combination mode is employed.

Figure 4:
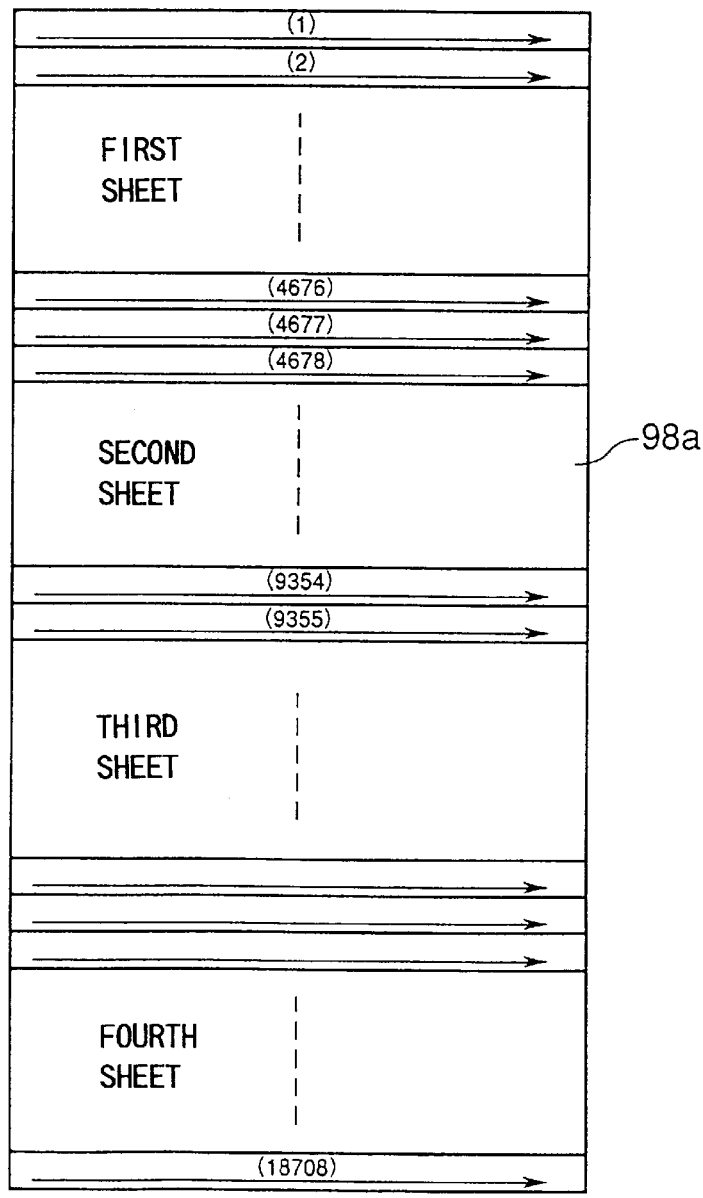
FIG. 4 is a diagram showing an example of stored image data in a buffer memory region.
Figure 5:
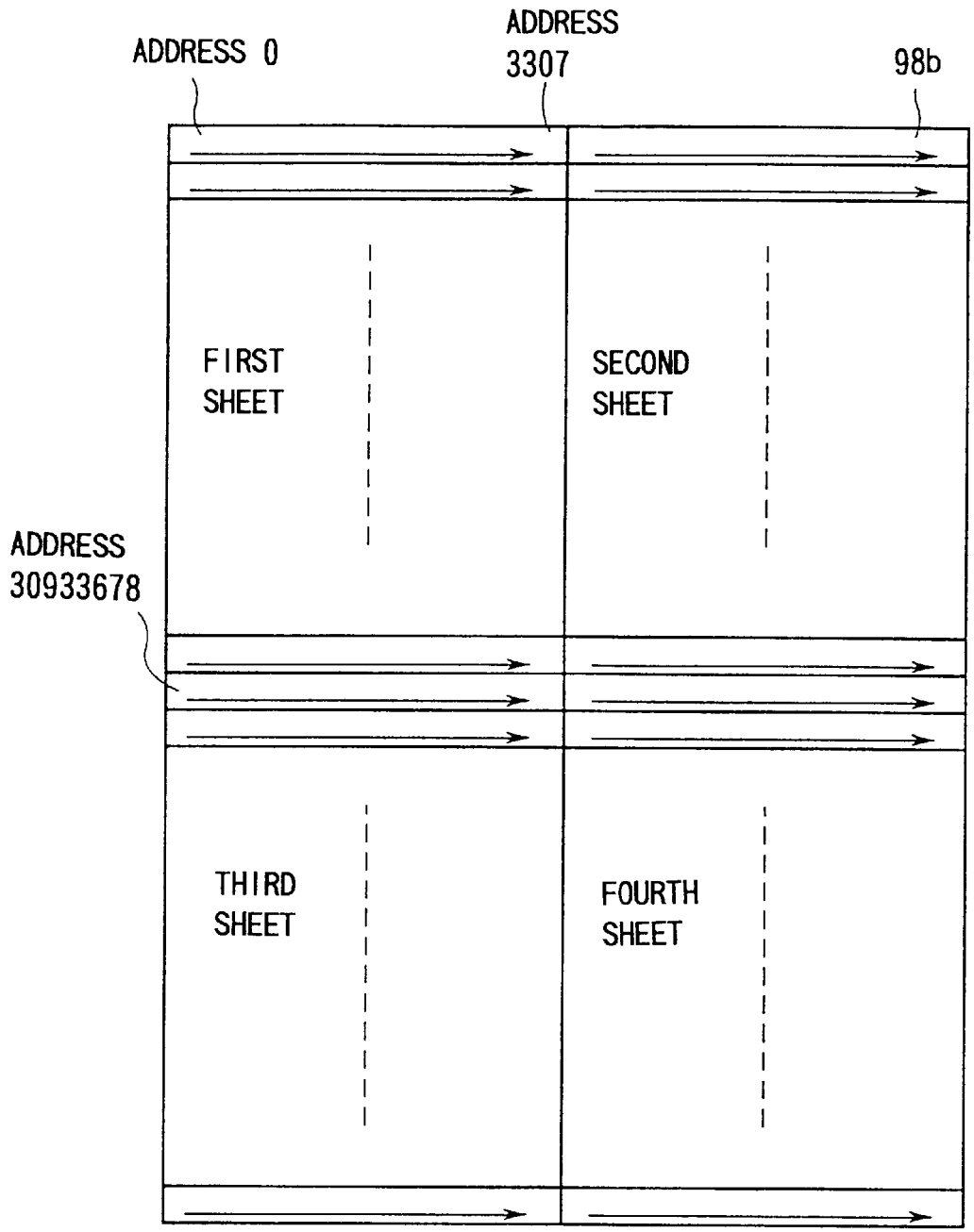
FIG. 5 is a diagram showing an example of stored composite image data in an image combining region.

The buffer memory region 98a sequentially stores image data for one scan line for each original document as shown in FIG. 4 when, for example, the 4in1 mode is employed as the combination mode. When the 4in1 mode has been employed as the combination mode and all of the original document sheets are in the form of the longitudinal document facing upwards and having lateral images, image data stored in the buffer memory region 98a is contracted to one-fourth and stored in the image combining region 98b such that image data on the first page is stored in the upper left portion, that on the second page is stored in the upper right portion, that on the third page is stored in the lower left portion and that on the fourth page is stored in the lower left portion, as shown in FIG. 5. Synthesized image data stored in the image combining region 98b is read in the sequential order as the first line of image data on the first page, the first line of image on the second page, the second line of image on the first page, the second line of image data on the second page, . . . , so as to be supplied to the printer section 6 through the image data bus 150.

The printer font ROM 151 stores font data corresponding to print data.

The printer controller 99 develops print data supplied from an external apparatus 130, such as a personal computer, with the resolution indicated by data provided for print data above, the printer controller 99 using font data stored in the printer font ROM 151 when it performs the development.

The scanner section 4 has a scanner CPU 100 for totally controlling the scanner section 4, a ROM 101 in which the control program and the like are stored, a RAM 102 for storing data, a CCD driver 103 for operating the CCD sensor 34, a scan motor driver 104 for controlling rotation of a motor for moving the exposure lamp 25 and the mirrors 26, 27 and 28, and an image correction section 105 consisting of an A/D conversion circuit for converting an analog signal supplied from the CCD sensor 34 into a digital signal, a shading correction circuit for correcting change in the threshold level for an output signal from the CCD sensor 34 occurring due to dispersion of the CCD sensor 34 and the change in the ambient temperature and a line memory for temporarily storing the digital signal, which has been supplied from the shading correction circuit and which has been subjected to the shading correction process.

The printer section 6 consists of a printer CPU 110 for totally controlling the printer section 6, a ROM 111, in which the control program and the like are stored, a RAM 112 for storing data, a laser driver 113 for turning on or off light emission from the semiconductor laser 41, a polygonal-mirror-motor driver 114 for controlling rotation of the polygon-mirror motor 37 in the laser exposure section 40, a paper conveying section 115 for controlling conveyance of the copy paper P through the conveying passage 58, a development processing section 116 for performing electric charge, development and transference by using the electrorifying charger 45, the developing unit 46 and the transfer charger 48, a fixing control section 117 for controlling the fixing unit 60 and an option section 118.

The image processing section 96, the page memory control section 97, the page memory 98, the printer controller 99, the image correction section 105 and the laser driver 113 are connected to one another by the image data bus 150.

Figure 6:
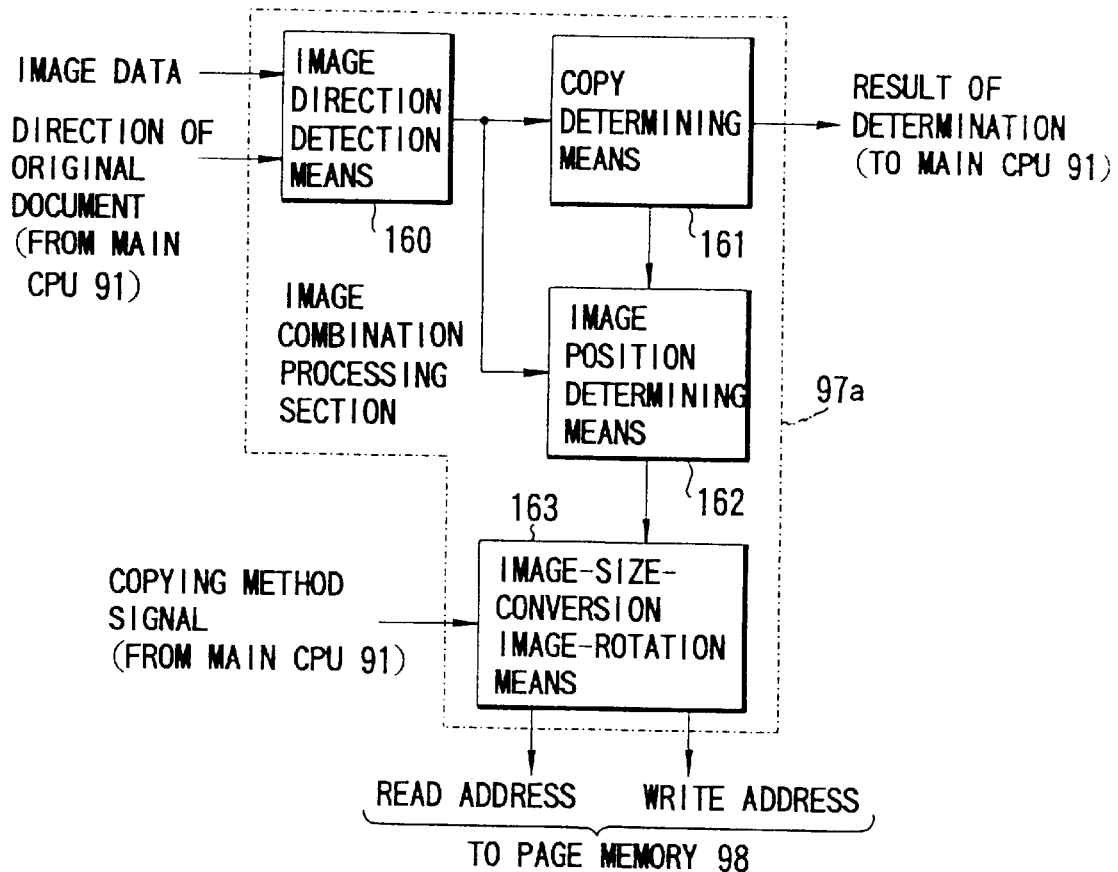
FIG. 6 is a block diagram showing the schematic structure of an image combination processing section.

The image combination processing section 97a is composed of an image direction detection means 160, a copy determining means 161, an image position determining means 162 and an image-size-conversion/image-rotation means 163, as shown in FIG. 6.

The image direction detection means 160 uses image data for one page supplied from the image correction section 105 in the scanner section 4 through the image data bus 150 to determine whether the direction of characters is lateral or longitudinal, whether the original document is written longitudinally or laterally and whether the image faces upwards or downwards.

The copy determining means 161 determines whether or not the operation for copying the image is interrupted if the directions of the original document sheets are different from one another, the determination being performed in accordance with a result of the detection of the direction of the plural original document sheets supplied from the image direction detection means 160.

The image position determining means 162 determines the size of the image which must be converted, an angle required to be rotated and the positions of the images in accordance with the direction of the original document and a result of the detection of the direction performed by the image direction detection means 160.

The image-size-conversion/image-rotation means 163 uses a result of the determination performed by the image position determining means 162 and a copy method signal supplied from the main CPU 91 to transmit image memory address to the page memory 98. The image-size-conversion/image-rotation means 163 supplies the read address in the buffer memory region 98a and write address in the image combining region 98b when the images are combined.

Figure 7:
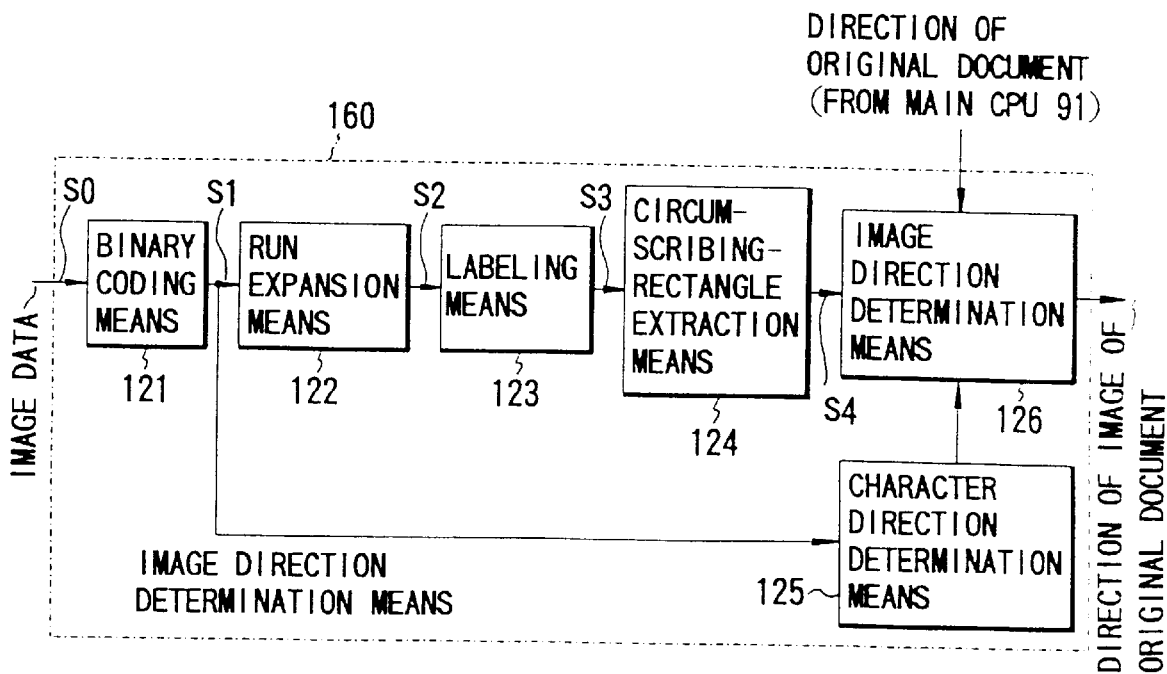
FIG. 7 is a block diagram showing the schematic structure of an image direction detection section.

The image direction detection means 160 is, as shown in FIG. 7, composed of a binary coding means 121, a run expansion means 122, a labeling means 123, a circumscribing-rectangle extraction means 124, a character direction determination means 125 and an image direction determination means 126.

That is, symbols S0 represent a supplied image signal. Input image signal S0 is subjected to a comparison with a predetermined threshold value Th in the binary coding means 121 so as to be binary-coded so that a binary-coded image signal S1 is transmitted. The binary coding means 121 is composed of a threshold value memory for storing the threshold value Th and a comparator for subjecting the input image signal S0 and the threshold value Th to a comparison. If the input image signal S0 is smaller than the binary-coded threshold value Th, the binary coding means 121 transmits "0" as the binary-coded image signal S1. If the input image signal S0 is larger than the binary-coded threshold value Th, the binary coding means 121 transmits "1". The comparison process is performed in accordance with the following equation (1):

$$S1=0: S0<Th$$
$$S1=1: S0<Th \tag{1}$$

Figure 8:
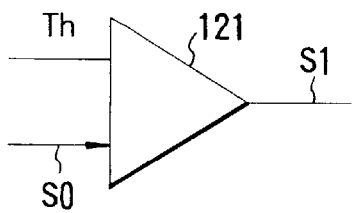
FIG. 8 is a diagram showing an example of a binary-coding means.

FIG. 8 shows the structure of the binary coding means 121. The binary coding means 121 comprises an 8-bit comparator. An 8-bit input image signal 1 and a predetermined 8-bit threshold value Th are subjected to a comparison so that the binary-coded image signal S1 is, under the condition expressed in equation (1), supplied to the run expansion means 122 and the character direction determination means 125.

The thus-binary-coded image signal by the various binary coding means 121 is subjected to a process for expanding black pixels in the main scan direction by the run expansion means 122. The run expansion means 122 performs the image expansion process in response to the binary-coded image signal S1.

If a black pixel exists in a range of a predetermined number of pixels from a target pixel (a black pixel) in the main scan direction, all of pixels from the target pixel to the above-mentioned pixel are replaced by black pixels.

Figure 9A:
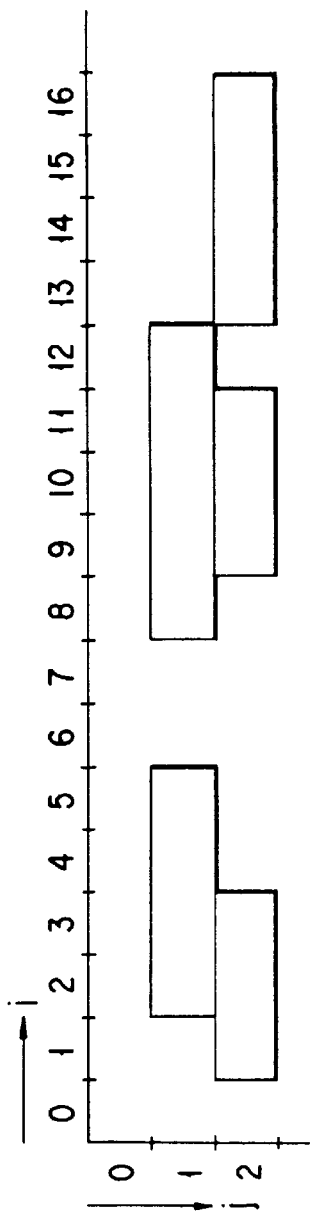
FIGS. 9A and 9B are diagrams showing a run expansion processing method.
Figure 9B:
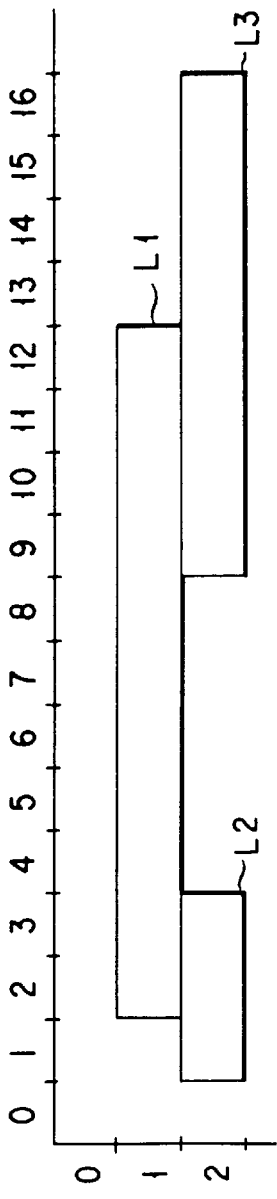

The run expansion will be explained in detail with reference to FIGS. 9A and 9B. For facilitating the explanation, the range of the number of pixels is set to "4". In FIGS. 9A and 9B, the position of each pixel of a binary image is expressed by coordinates (i, j) in the X and Y directions.

Suppose a case as shown in FIG. 9A, where black pixels continue from a position with coordinates (2, 1) to a position with coordinates (5, 1) in the main scan direction, and further black pixels continue from a position with coordinates (8, 1) to a position with coordinates (12, 1) in the main scan direction, with two white pixels interposed therebetween. In this case, the interposed white pixels are replaced with black pixels, and accordingly a run (black pixel portion) L1 as shown in FIG. 9B is obtained in which black pixels continue from the position with coordinates (2, 1) to the position with coordinates (12, 1).

As regards pixels with coordinates (1, 2) in FIG. 9A, black pixels continue from a position with coordinates (1, 2) to a position with coordinates (3, 2) in the main scan direction. However, no black pixels exist within a range of 4 pixels from a position with coordinates (4, 2). Therefore, no change is made to pixels from the position with coordinates (4, 2) to a position with coordinates (8, 2), thereby providing a run L2 as shown in FIG. 9B.

Similarly, a white pixel existing between a black pixel with coordinates (11, 2) and a black pixel with coordinates (13, 2) is replaced with a black pixel, thereby obtaining a run L3 which continue from a black pixel with coordinates (9, 2) to a black pixel with coordinates (16, 2), as shown in FIG. 9B. As described above, where there is a black pixel within a range of four pixels in the main scan direction, any white pixel between black pixels is replaced with a black pixel.

Figure 10:
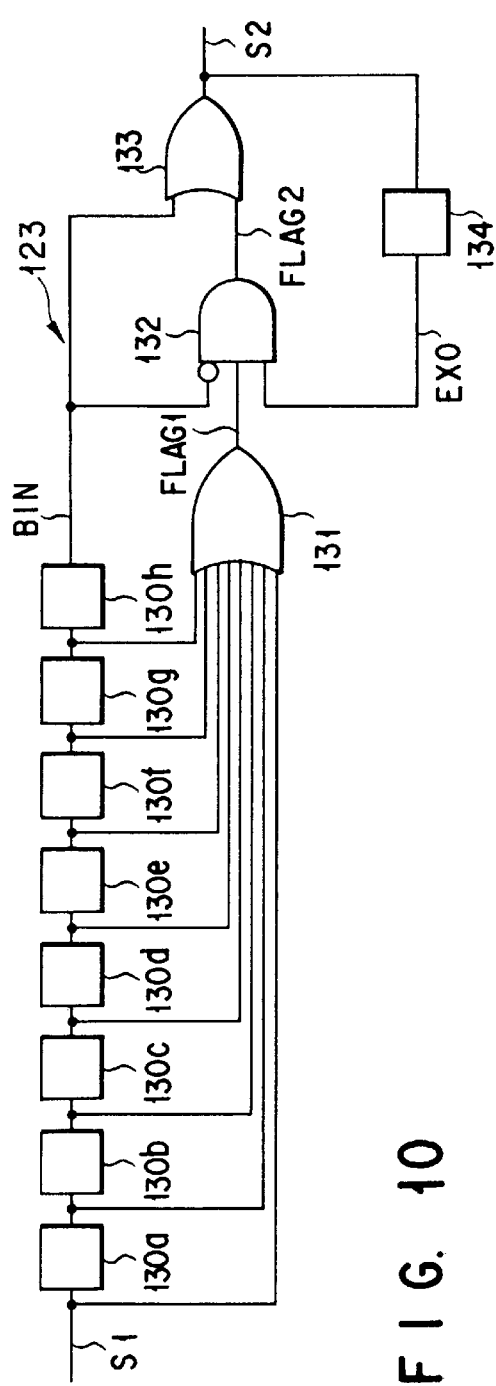
FIG. 10 is a diagram showing an example of a circuit for executing the run expansion process.

FIG. 10 shows an example of a circuit for performing the run expansion. In the FIG. 10 case, the binary pixel signal S1 is input to a latch circuit 130a. The latch circuit 130a and latch circuits 130b to 130h are connected in series such that the output of each of the latch circuits is input to the next one connected thereto. In other words, a binary pixel signal S1 (a binary pixel value) corresponding to a first pixel is input to the latch circuit 130a together with an image clock pulse in synchronism with the first pixel. Then, the signal S1 is latched (temporarily held) by the latch circuit (which consists of a flip-flop circuit) 130a in synchronism with the image clock pulse, and output to the next latch circuit 130b. The next latch circuit 130b latches the binary pixel value corresponding to the first pixel in synchronism with the image clock pulse corresponding to a second pixel. At this time, the latch circuit 130a latches a binary pixel value corresponding to the second pixel. Thus, the binary pixel value latched by each of the latch circuits is output to and latched by the next latch circuit.

The outputs of the latch circuits 130a to 130g are input to an OR circuit 134. The binary pixel signal S1 to be input to the first latch circuit 130a is also input to the OR circuit 134. The OR circuit 134 calculates the logical sum of them, and outputs it as a signal FLAG1 to an AND circuit 132. The binary pixel value output from the last latch circuit 130h is input to an OR circuit 133 and also to the inverted terminal of the AND circuit 132.

Supposing that the binary pixel value BIN latched by the latch circuit 130h is a target pixel, binary pixel values latched by the latch circuits 130a to 130g and a binary pixel value to be input to the latch circuit 130a respectively correspond to first through eighth pixels output after the target pixel. The OR circuit 131 outputs "1" as the signal FLAG1 if the first through eighth pixels include at least one black pixel, and outputs "0" as the signal FLAG1 if they include no black pixels. In other words, it can be determined from the signal FLAG1 whether or not at least one black pixel is included in 8 pixels output after the target pixel.

The binary pixel value BIN, the signal FLAG1, and a run expansion signal EXO (explained later) corresponding to a pixel scanned immediately before the target pixel are input to the AND circuit 132. If the target pixel latched by the latch circuit 130h is a white pixel, the AND circuit 132 determines whether or not black pixels between which the white pixel is situated are included in continuous 8 pixels, and outputs a signal FLAG2 indicative of the determination result. The value of the signal FLAG2 is determined as follows:

If the signal BIN is set at "0", the signal FLAG1 at "1", and the signal EXO at "1", the signal FLAG2 is set to "1";

If any of these conditions is not satisfied, the signal FLAG2 is set to "0".

The OR circuit 133 receives the binary pixel value BIN of the target pixel and the output signal FLAG2 of the AND circuit 132, and outputs a run expansion signal S2. The value of the signal S2 is determined as follows:

If the signal BIN is set at "1", or the signal FLAG2 at "1", the run expansion signal S2 is set to "1";

If the signal BIN is set at "0", and the signal FLAG2 at "0", the run expansion signal S2 is set to "0".

The above-described run expansion signal EXO corresponding to a pixel scanned immediately before the target pixel is obtained by delaying the run expansion signal S2 output from the OR circuit 133, by one pixel by means of a latch circuit 134 in synchronism with the image clock. On the basis of the run expansion signal S2 output as data concerning each run (each black pixel portion) extracted from a binary image, the coordinates of the start position of the run, those of the end position of the run, and the length of the run are obtained.

The labelling means 123 shown in FIG. 7 will now be explained. The labelling means 123 performs labelling processing, wherein connected runs are integrated as one region, on the basis of the run expansion signals S2 output by the run expansion means 122.

FIG. 11A shows examples of runs extracted by the run expansion means 122, and FIG. 11B a table which stores examples of run data obtained from the run expansion signals S2 corresponding to the runs shown in FIG. 11A.

The table of FIG. 11B stores a run number assigned to each run, the coordinates of the start position of the run, those of the end position of the run, and the length of the run. The labelling means 123 performs labelling on the basis of the run data. The run data may be stored in a predetermined memory area in the image processing apparatus of the invention.

In FIG. 11A, a run L10 with a run number of "1" is connected to a run L11 with a run number of "2", and further to a run L12 with a run number of "3". In other words, the runs L10 to L12 are all connected. The labelling means 123 integrates these runs as one region.

FIG. 12 shows data concerning integrated regions resulting from integrating the runs shown in FIG. 11A. A label "A" is assigned to an integrated region including connected runs with run numbers "1", "2" and "3", and the run numbers are stored as data indicating the feature of the region. The data shown in FIG. 12 is output as a signal S3 to the circumscribing-rectangle extraction means 124.

The circumscribing-rectangle extraction means 124 will be explained. This means determines the position and size of a rectangle which circumscribes each region integrated by the labelling means 123. Referring to FIGS. 13A to 13C, the principle of extraction of a circumscribing rectangle will be explained first.

FIG. 13A shows an example of a region from which a circumscribing rectangle is extracted, and which is the same region as that shown in FIG. 12 and has the label "A" assigned. That is, the region shown in FIG. 13A includes connected runs with the run numbers "1", "2" and "3". To determine the size of this region, comparison is made concerning the start points, the end points, the lengths, etc. of the runs extending from left to right on a target line and a line previous to the target line.

More specifically, take attention first to the run L11 on the target line and the run L10 on the previous line in FIG. 13A. Since the X-coordinate of the start point of the run L11 is lower than that of the start point of the run L10, the start point of the run L11 serves as the start point of a circumscribing rectangle which circumscribes the runs L10 and L11. On the other hand, since the X-coordinate of the end point of the run L10 is higher than that of the end point of the run L11, the end point of the run L11 serves as the end point of the circumscribing rectangle which circumscribes the runs L10 and L11. Thus, the circumscribing rectangle which circumscribes the runs L10 and L11 is indicated by the solid line shown in FIG. 13B.

Then, take attention to the runs L12 and L10 in FIG. 13A. Since the X-coordinate of the start point of the run L10 is lower than that of the start point of the run L12, the start point of the run L10 serves as the start point of a circumscribing rectangle which circumscribes the runs L10 and L12. On the other hand, since the X-coordinate of the end point of the run L12 is higher than that of the end point of the run L10, the end point of the run L12 serves as the end point of the circumscribing rectangle which circumscribes the runs L10 and L12. Further, in light of the circumscribing rectangle indicated by the solid line in FIG. 13B, a circumscribing rectangle which circumscribes the runs L10, L11 and L12 is indicated by the solid line shown in FIG. 13C.

As regards the region with the label "A" wherein the runs L10 to L12 shown in FIG. 13A are integrated, the circumscribing-rectangle extraction means 124 uses the lowest X-coordinate and the lowest Y-coordinate of the coordinates (x1, y1), (x2, y2) and (x3, y3) of the start points of the runs L10 to L12, as the coordinates (xs, ys) of the start point of the circumscribing rectangle. In other words, where the coordinates of the start points of a number n of runs included in a region with a certain label are (x1, y1), (x2, y2), . . . , (xn, yn), the coordinates (xs, ys) of the start point of the circumscribing rectangle of the runs are given by $$xs = \min(x1, x2, \ldots, xn)$$

$$ys = \min(y1, y2, \ldots, yn)$$

Similarly, the coordinates (xe, ye) of the end point of the circumscribing rectangle are given by $$xe = \max(x1, x2, \ldots, xn)$$

$$ye = \max(y1, y2, \ldots, yn)$$

Moreover, the size of the circumscribing rectangle, i.e. the x-directional and y-directional lengths (x1, y1), is given by $$x1 = xe - xs + 1$$

$$y1 = ye - ys + 1$$

Circumscribing-rectangle data S4 calculated in the above-described manner on the basis of the run data shown in FIG. 11B are stored as shown in FIG. 14. The FIG. 14 table stores the coordinates of the start point and the size (x1, y1) of the circumscribing rectangle with the label "A".

The specific conditions for determining the size of the circumscribing rectangle will be explained with reference to FIGS. 15A to 15F. In FIGS. 15A to 15F, run data items X0, Y0, and M0 indicate the x-coordinate X0 and the y-coordinate Y0 of the start point of a run L20 on a first line, and the run length M0 of the run, respectively. Run data items X1, Y1, and M1 indicate the x-coordinate X1 and the y-coordinate Y1 of the start point of a run L21 on a second line, and the run length M1 of the run, respectively. Moreover, the start point of a circumscribing rectangle obtained by the determination is indicated by the x-coordinate and the y-coordinate, and the size of the rectangle by the x-directional length and the y-directional length.

To determine the size of the circumscribing rectangle, the relationship in position between the run L20 on the first line and the run L21 on the second line must be determined. Specifically, six cases as shown in FIGS. 15A to 15F must be considered.

Figure 15A:
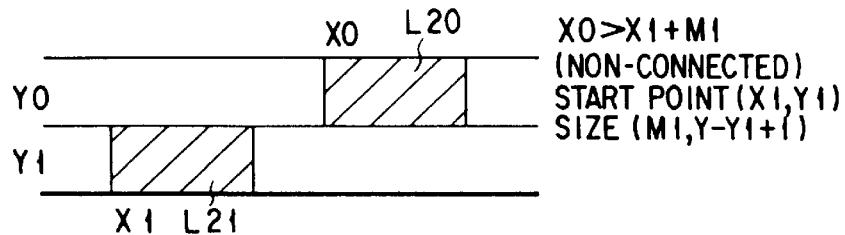
FIGS. 15A to 15F are diagrams showing conditions for determining the size of the circumscribing rectangle.

FIG. 15A is a view, useful in explaining first determination conditions, wherein the x-coordinates of the start and end points of the run L21 on the second line are lower than those of the run L20 on the first line, and the runs L20 and L21 are not connected to each other. In other words, if X0>X1+M1, it is determined that the runs L20 and L21 are not connected to each other. As a result, the start point of the obtained circumscribing rectangle is determined to be (X1, Y1), and the size of the same (M1, Y−Y1+1). Y represents the number of a line being processed, and Y=Y1 in the FIG. 15A case.

Figure 15B:
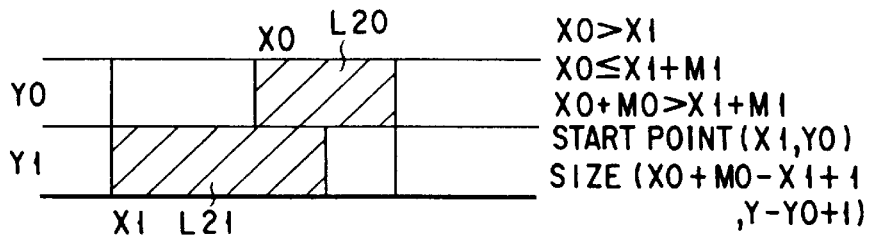

FIG. 15B is a view, useful in explaining second determination conditions, wherein the x-coordinates of the start and end points of the run L21 on the second line are lower than those of the run L20 on the first line, and the runs L20 and L21 are connected to each other. In other words, if X0>X1, X0 . . . X1+M1, and X0+M0>X1+M1, the start point of the obtained circumscribing rectangle is (X1, Y0), and the size of the same is (X0+M0−X1+1, Y−Y0+1).

Figure 15C:
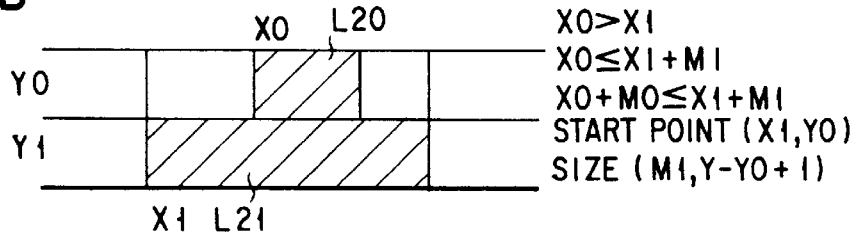

FIG. 15C is a view, useful in explaining third determination conditions, wherein the x-coordinate of the start point of the run L21 on the second line is lower than that of the run L20 on the first line, the x-coordinate of the end point of the run L21 is higher than that of the run L20, and the runs L20 and L21 are connected to each other. In other words, if X0>X1, X0≦X1+M1, and X0+M0≦X1+M1, the start point of the obtained circumscribing rectangle is (X1, Y0), and the size of the same is (M1, Y−Y0+1).

Figure 15D:
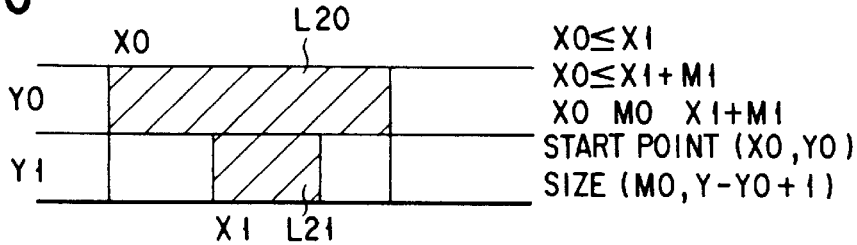

FIG. 15D is a view, useful in explaining fourth determination conditions, wherein the x-coordinate of the start point of the run L21 on the second line is higher than that of the run L20 on the first line, the x-coordinate of the end point of the run L21 is lower than that of the run L20, and the runs L20 and L21 are connected to each other. In other words, if X0≦X1, X0 . . . X1+M1, and X0+M0>X1+M1, the start point of the obtained circumscribing rectangle is (X0, Y0), and the size of the same is (M0, Y−Y0+1).

Figure 15E:
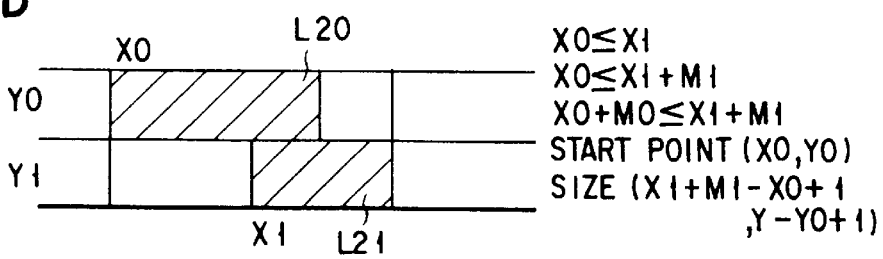

FIG. 15E is a view, useful in explaining fifth determination conditions, wherein the x-coordinate of the start point of the run L21 on the second line is higher than that of the run L20 on the first line, the x-coordinate of the end point of the run L21 is higher than that of the run L20, and the runs L20 and L21 are connected to each other. In other words, if X0≦X1, X0≦X1+M1, and X0+M0≦X1+M1, the start point of the obtained circumscribing rectangle is (X0, Y0), and the size of the same is (X1+M1−X0, Y−Y0+1).

Figure 15F:
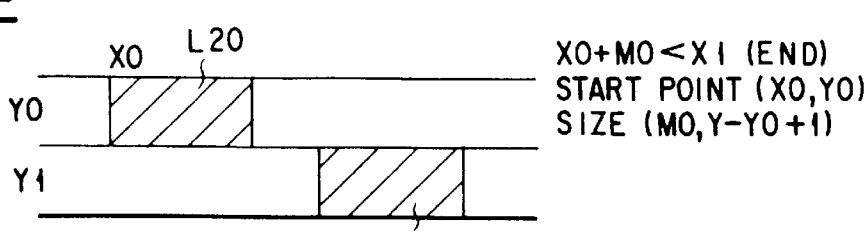

FIG. 15F is a view, useful in explaining sixth determination conditions, wherein the x-coordinates of the start and end points of the run L21 on the second line are higher than those of the run L20 on the first line, and the runs L20 and L21 are not connected to each other. In other words, if X0+M0<X1, it is determined that the connection state of the run L20 on the first line and L21 is terminated. As a result, the start point of the obtained circumscribing rectangle is (X0, Y0), and the size of the same (MO, Y−Y0+1).

FIG. 16 shows examples of the labelling means 123 and the circumscribing-rectangle extraction means 124. As is shown in FIG. 16, concerning the run expansion signal S2 from the run expansion means 122, run data (the X and Y coordinates of the start point of a run on a first line, and the run length of the run) are stored in a memory 141 via a selector 140. The run data stored in the memory 141 are supplied to comparators 143a to 143e via a selector 142, where the run data concerning the runs on the first and second lines are compared with each other. Further, the run data stored in the memory 141 is supplied also to an adder-subtracter 144 via the selector 142, where the run data are subjected to addition and subtraction if the runs on the first and second lines are connected to each other, thereby calculating the coordinates of the start point of the integrated region including connected runs, the size of the region, etc.

The comparator 143a compares the x-coordinate X0 of the start point of a first run on the first line with the x-coordinate X1 of that of a first run on the second line.

At this time, if X0>X1, the comparator 143a outputs "1" as a comparison signal S30, whereas if X0≦X1, it outputs "0" as the signal S30.

The comparator 143b compares the x-coordinate X0 of the start point of the first run on the first line with the x-coordinate (X1+M1) of the end point of the first run on the second line.

At this time, if X0>X1+M1, the comparator 143b outputs "1" as a comparison signal S31, whereas if X0≦X1+M1, it outputs "0" as the signal S31.

The comparator 143c compares the x-coordinate (X0+M0) of the end point of the first run on the first line with the x-coordinate (X1+M1) of the end point of the first run on the second line.

At this time, if X0+M0>X1+M1, the comparator 143c outputs "1" as a comparison signal S32, whereas if X0+M0≦X1+M1, it outputs "0" as the signal S32.

The comparator 143d compares the x-coordinate (X0+M0) of the end point of the first run on the first line with the x-coordinate X1 of the start point of the first run on the second line.

At this time, if X0+M0>X1, the comparator 143d outputs "1" as a comparison signal S33, whereas if X0+M0≦X1, it outputs "0" as the signal S33.

The comparator 143e compares the y-coordinate Y0 of the start point of the first run on the first line with the y-coordinate Y1 of that of the first run on the second line.

At this time, if Y0>Y1, the comparator 143e outputs "1" as a comparison signal S34, whereas if Y0≦Y1, it outputs "0" as the signal S34.

When the runs are connected to each other, the adder-subtracter 144 calculates the following to obtain the size (length) of an integrated region of the runs:

$$X0+M0-X1+1$$

or $$X1+M1-X0+1$$

The adder-subtracter 144 supplies a selector 146 with X0, Y0, X1, Y1, M0, M1, X0+M0−X1+1, and X1+M1−X0+1 as signals S35 including calculation results, etc.

On the basis of the signals S30, S31, S33 and S34, a determination table 145 determines the positional relationship between the runs on the first and second lines as described above. Specifically, depending upon the above-described first through sixth determination conditions, the determination table 145 outputs selection signals S36 and S37 to the selectors 142 and 146 and memories 147 and 148, and a run selection signal S38. The run selection signal S38 is used to shift the run to be processed from one to another, and stored in a memory (which is not shown but also stores the run expansion signal S2).

The selection signal S37 is of 4 bits, lower three ones of which are determined depending upon the first through sixth determination conditions, and the highest one of which consists of the comparison signal S34. Where the determination table 145 determines that the first determination conditions are satisfied, i.e. where the comparison signal S31 is "1", the run on the second line is not connected to the run on the first line as shown in FIG. 15A. In this case, the determination table 145 outputs "0" as the selection signal S36, "000" as the lower three bits of the selection signal S37, and "1" as the run selection signal S38.

Where the determination table 145 determines that the second determination conditions are satisfied, i.e. where the comparison signals S30, S31 and S32 are "1", "0" and "1", respectively, the run on the second line is connected to the run on the first line as shown in FIG. 15B. In this case, the determination table 145 outputs "0" as the selection signal S36, "001" as the lower three bits of the selection signal S37, and "1" as the run selection signal S38.

Where the determination table 145 determines that the third determination conditions are satisfied, i.e. where the comparison signals S30, S31 and S32 are "1", "0" and "0", respectively, the run on the second line is connected to the run on the first line as shown in FIG. 15C. In this case, the determination table 145 outputs "0" as the selection signal S36, "010" as the lower three bits of the selection signal S37, and "0" as the run selection signal S38.

Where the determination table 145 determines that the fourth determination conditions are satisfied, i.e. where the comparison signals S30, S31 and S32 are "0", "0" and "1", respectively, the run on the second line is connected to the run on the first line as shown in FIG. 15D. In this case, the determination table 145 outputs "0" as the selection signal S36, "011" as the lower three bits of the selection signal S37, and "1" as the run selection signal S38.

Where the determination table 145 determines that the fifth determination conditions are satisfied, i.e. where the comparison signals S30, S31 and S32 are "0", "0" and "0", respectively, the run on the second line is connected to the run on the first line as shown in FIG. 15E. In this case, the determination table 145 outputs "0" as the selection signal S36, "100" as the lower three bits of the selection signal S37, and "0" as the run selection signal S38.

Where the determination table 145 determines that the sixth determination conditions are satisfied, i.e. where the comparison signal S33 is "0", connection of the runs on the first and second lines is completed as shown in FIG. 15F. In this case, the determination table 145 outputs "1" as the selection signal S36, "101" as the lower three bits of the selection signal S37, and "0" as the run selection signal S38.

The output of the adder-subtracter 144 is input to the selector 146, which in turn outputs label data corresponding to the lower three bits of the selection signal S37. The word "label" means a region formed by integrating the runs on the first and second lines, and the "label data" indicate the start point of the label, the size thereof, etc.

When the lower three bits of the selection signal S37 are "000", the selector 146 outputs (X1, Y1) as the start point coordinates of the label, and (M1, Y−Y1+1) as the size of the label (see FIG. 15A).

When the lower three bits of the selection signal S37 are "001", the selector 146 outputs (X1, Yp) as the start point coordinates of the label, and (M1, Y−Yp+1) as the size of the label (see FIG. 15B) (Yp indicates the lower one of y-coordinates Y0 and Y1 which is determined by the comparator 143a to 143e).

When the lower three bits of the selection signal S37 are "010", the selector 146 outputs (X1, Yp) as the start point coordinates of the label, and (M1, Y−Yp+1) as the size of the label (see FIG. 15C).

When the lower three bits of the selection signal S37 are "011", the selector 146 outputs (X0, Yp) as the start point coordinates of the label, and (M0, Y−Yp+1) as the size of the label (see FIG. 15D).

When the lower three bits of the selection signal S37 are "100", the selector 146 outputs (X0, Yp) as the start point coordinates of the label, and (X1+M1−X0+1, Y−Yp+1) as the size of the label (see FIG. 15E).

When the lower three bits of the selection signal S37 are "101", the selector 146 outputs (X0, Y0) as the start point coordinates of the label, and (M0, Y−Y0+1) as the size of the label (see FIG. 15F).

The selection signal S36 selects one of a memory 147 for internal calculation and a buffer memory 148 for outputting a result of labelling processing, to store therein the label data output from the selector 146. Specifically, only when the sixth determination conditions are satisfied in the determination table 145 and the run connection is completed (the FIG. 15F case), "1" is output as the selection signal S36. At this time, label data output as a signal S42 from the selector 146 is stored in the memory 148.

The memory 147 stores the label data output as the signal S42 from the selector 146, i.e. stores run data for each line, which includes the determination result of the determination table 145 concerning runs on the first and second lines, the start point coordinates of an integrated region of the runs, the size of the region, etc. For example, while the comparators 143a to 143e perform comparison processing concerning runs on the first and second lines, the memory 147 stores the start point coordinates and the size of the region formed by integrating the runs, or run data concerning the run on the second line when the runs on the first and second lines are not connected to each other, etc. Accordingly, where the runs are connected to each other, the size, etc. of the integrated region including the connected runs are updated each time the line to be processed is shifted from one to another.

The memory 148 stores data on labels obtained by the determination of the determination table 145 which is performed on the basis of runs included in one image (one page of an image document), i.e. data on rectangles which circumscribe labels each formed of an integrated region including connected runs. If the determination table 145 determines that the runs are not connected to each other, it also determines that a run-integrated label has been extracted, and the start point coordinates and the size of a rectangle which circumscribes the extracted label are stored in the memory 148 in the form of the table shown in FIG. 14.

The run selection signal S38 is used, at the time of updating data to be compared by the comparators 143a to 143e and data to be subjected to calculation using the adder-subtracter 144, to determine which one of run data concerning the first line (which is stored in the memory 141 and output as the signal S41) and run data concerning the second line (which is indicated by the run expansion signal S2) should be updated. For example, if the run selection signal S38 is "0" (i.e. if the determination table 145 determines that the third, the fifth or the sixth determination conditions are satisfied), the run data concerning the first line (the signal S41) is updated as data to be compared and subjected to addition/subtraction. If, on the other hand, the run selection signal S38 is "1" (i.e. if the determination table 145 determines that the first, the second and the fourth determination conditions are satisfied), the run data concerning the second line (the run expansion signal S2) is updated as data to be compared and subjected to addition/subtraction.

The selector 142 outputs the run data concerning the first line (the signal S41) stored in the memory 141 when the selection signal S36 is "1" to indicate that the run connection has been completed, and outputs label data (the signal S42) supplied from the selector 146 when the selection signal S36 is "0". In accordance with the output of the selector 142, data in the comparators 143a to 143e and in the adder-subtracter 144 are updated.

The above-described processing is repeated till the end of the first line. When the first line has been all processed, run data concerning the second line (a signal S47) stored in the memory 147 is stored in the memory 41 via the selector 140. Thereafter, the above-described processing is performed for run data concerning the second line (the signal S41) and run data concerning a third line (the run expansion signal S2). Thus, the same processing is repeated till the end of one page.

As a result of the above-described processing, the memory 148 stores data on labels extracted from one page of the image document, i.e. data on rectangles which circumscribe the labels each formed by integrating connected runs (the start point coordinates and the sizes of the rectangles as shown in FIG. 14).

The character direction determination means 125 will now be described. The character direction determination means 125, for each character, separates image data binary-coded by the binary coding means 121 corresponding to one of circumscribing rectangles obtained by the circumscribing-rectangle extraction means 124. The character direction determination means 125 compares each of the separated characters and a standard character pattern of a dictionary (not shown) with each other to determine whether the direction of the character is longitudinal or lateral. The foregoing process is required to be performed for several characters in the circumscribing rectangle. A result of determination of the direction of the character performed by the character direction determination means 125 is supplied to the image direction determination means 126.

The image direction determination means 126 will now be described. The image direction determination means 126 uses the start coordinates and the size of the circumscribing rectangle obtained by the circumscribing-rectangle extraction means 124 and a result of the determination of the direction of the character supplied from the character direction determination means 125 to determine the direction of the image of the original document.

The image direction determination means 126 comprises, for example, a CPU to determine whether the original document is written longitudinal or lateral and whether the image of the original document faces upwards or downwards.

Initially, a method of determining whether the original document is written longitudinally or laterally in a case where characters in a circumscribing rectangle (a rectangle including characters in one row or one column) are formed longitudinally will now be described. The determination is performed in accordance with the size of a circumscribing rectangle obtained by the circumscribing-rectangle extraction means 124. In a case of an original document written laterally, the size of a circumscribing rectangle, that is, the size of character rows is in the form elongated laterally and short in the longitudinal direction. By using the foregoing fact, and assuming that the size of each of i circumscribing rectangles having labels 1, 2, 3, . . . , 1 respectively are (x11, y11), (x12, y12), (x13, y13), . . . , (x1i, y1i), the following calculations are performed:

$$xa = \sum_{k=1}^{i} xlk, / i$$

$$ya = \sum_{k=1}^{i} ylk, / i$$

where xa and ya respectively are average values of lateral sizes and longitudinal sizes of all of the circumscribing rectangles. If $xa \geq ya$, then a determination is made that the original document is written laterally. In the other cases, the original document is determined to be written longitudinally. If the characters in the circumscribing rectangle are formed laterally and xa≧ya, the original document is determined to be written longitudinally. In the other cases, the original document is determined to be written laterally.

Then, a method of determining whether the original document faces upwards or downwards will now be described with reference to FIGS. 17 and 18.

The determination is performed on the basis of the position of the circumscribing rectangle. That is, if the characters in the circumscribing rectangle are formed in the longitudinal direction and the original document is a lateral original document and the original document faces upwards, then the left ends of the circumscribing rectangles (the character strings) are aligned as shown in FIGS. 17A and 17B because the left ends are starts positions for sentences. On the other hand, the right ends are not aligned because the right ends are ends of the sentences. By using the above-mentioned characteristic of the document, whether the original document faces or downwards can be determined.

$$xb = \sum_{k=1}^{i} xsk/i$$

$$d1 = \sum_{k=1}^{i} (xsk - xb)/i$$

$$d2 = \sum_{k=1}^{i} (xsk + x1k - xb)/i$$

where xb is an average value of start positions of the circumscribing rectangles and d1 is an average value of errors of the circumscribing rectangles with respect to the average value of the start positions.

On the other hand, d2 is an average value of errors of the circumscribing rectangles with respect to an average value of the end positions. In accordance with a result of a comparison between d1 and d2, the direction in which the original document faces can be determined. That is, if $d1 \geq d2$, the direction of the image of the original document is inverted (see FIGS. 18A and 18B). In the other cases, the direction of the image of the original document is determined to be a normal direction (the upward direction). The image direction determination means 126 determines the vertical direction of the image on the original document by the foregoing process.

Also in a case where characters in the circumscribing rectangle are formed in the lateral direction and the original document is written longitudinally, the vertical direction of the image of the original document can be determined.

By using the above-mentioned procedure, the direction of the image can be determined. The copy determining means 161 determines interruption of copying of the image in a case where the direction of the image of the previous page and the direction of the image of the original document input at present are different from each other.

A result of the determination performed by the copy determining means 161 is supplied to the main CPU 91. The main CPU 91 interrupts the copying operation. Thus, the display section 82a displays a message that, for example, the direction of the set image has an error to notify the user the interruption of the operation for copying the image. Moreover, the display section 82a requires the user to operate the key to indicate whether or not the user continues the copying operation.

If the user instructs to continue the operation, the copying operation is continued. The copying operation can be interrupted by instructing interruption. In this case, the user again confirms the direction of the image of the original document and again sets the original document so as to perform the copying operation.

In another embodiment in which the directions of the original documents are different from one another, adequate rotation of the images is performed to correct the directions so as to generate copied images.

The following structure may be employed in a case where the apparatus comprises the copy determining means 161, the display section 82a and the input section 82: if a determination is performed by the copy determining means 161 that the direction of the image of the previous page and the direction of the image of the input original document are different from each other, the rotation of the image is performed; a message whether or not the copying operation is continued is displayed on the display section 82a; and a determination whether or not the copying operation is continued is caused to be performed by the user by using the input section 82.

As described above, the structure comprising the copy determining means 161, the display section 82a and the input section 82 permits a variety of modifications within the scope of the present invention.

The direction of the image is determined as described above, and image data supplied from the image correction section 105 in the scanner section 4 through the image data bus 150 is stored in the buffer memory region 98a of the page memory 98.

The image position determining means 162 determines the position, at which the images are formed, in accordance with the method of the copy (for example, two A4-size original document sheets are contracted to copy the images on one A4-size sheet or four A4-size original document sheets are contracted to copy the images on one A4-size sheet). That is, the positions, at which images of a plurality of supplied original document sheets are copied, must be changed in accordance with information about the direction of the image supplied from the image direction detection means 160.

A case will now be considered in which two A4-size original document sheets are contracted to copy the images on one A4-size original document sheet, as shown in FIGS. 19A to 20B.

Figures 19A, 19B:
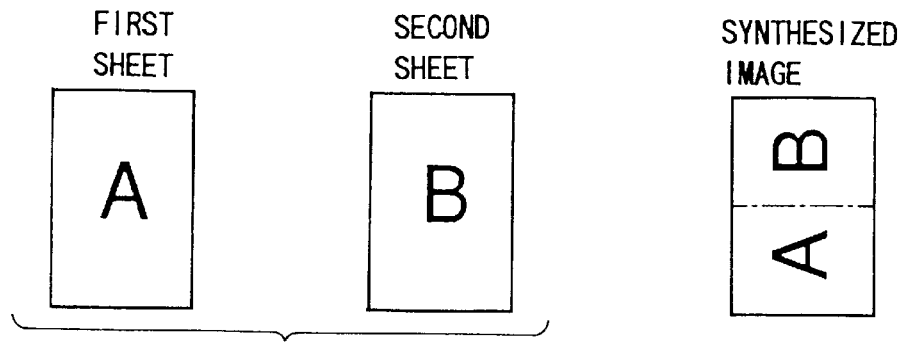
FIGS. 19A and 19B are diagrams showing the relationship of configuration between the original document and the composite image.

If the direction of the original document is longitudinal as shown in FIG. 19A, the positions of the input images of the two original document sheets in the composite image are as shown in FIG. 19B. That is, the two input images are generally located in the lower portion and the upper portion, respectively.

Figures 20A, 20B:
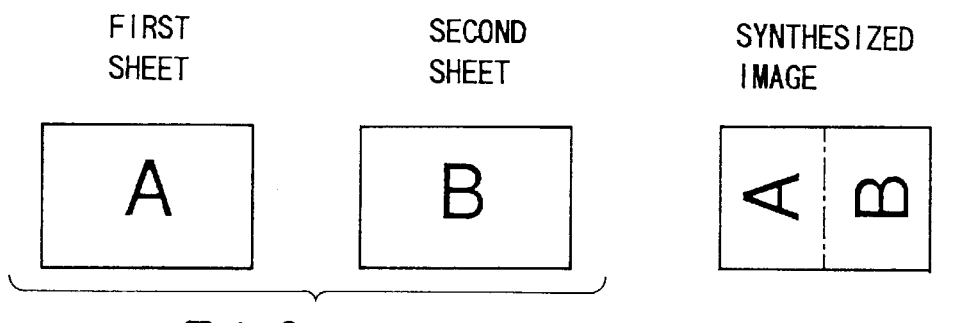
FIGS. 20A and 20B are diagrams showing the relationship of configuration between the original document and the composite image.

If the direction of the original document is lateral as shown in FIG. 20A, the positions of the input images of the two original document sheets in the composite image are as shown in FIG. 20B. That is, the two input images are generally located in the left portion and the right portion, respectively.

A case will now be considered in which four A4-size original document sheets are contracted to copy the images on one A4-size original document sheet, as shown in FIGS. 21A to 22B.

Figure 21A:
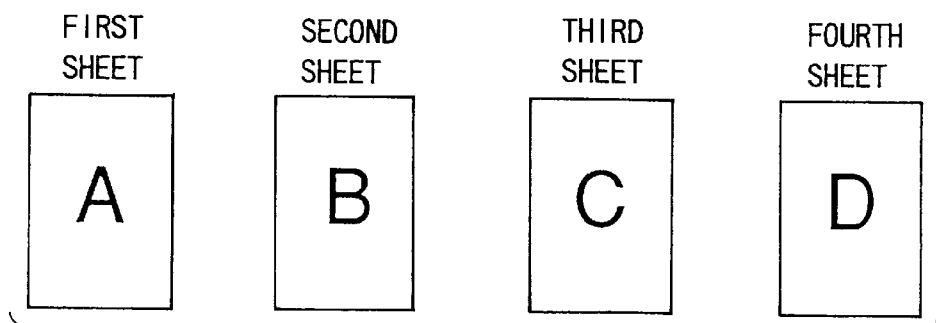
FIGS. 21A and 21B are diagrams showing the relationship of configuration between the original document and the composite image.
Figure 21B:
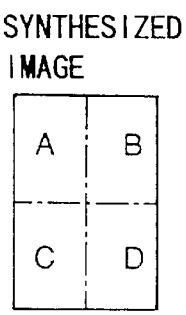

In a case where the direction of the image of the original document is longitudinal as shown in FIG. 21A, the positions of the input images of the four original document sheets in the composite image are as shown in FIG. 21B. That is, the four input images are generally located at the upper left, upper right, lower left and the lower right positions in this sequential order.

Figures 22A, 22B, 23, 24A, 24B:
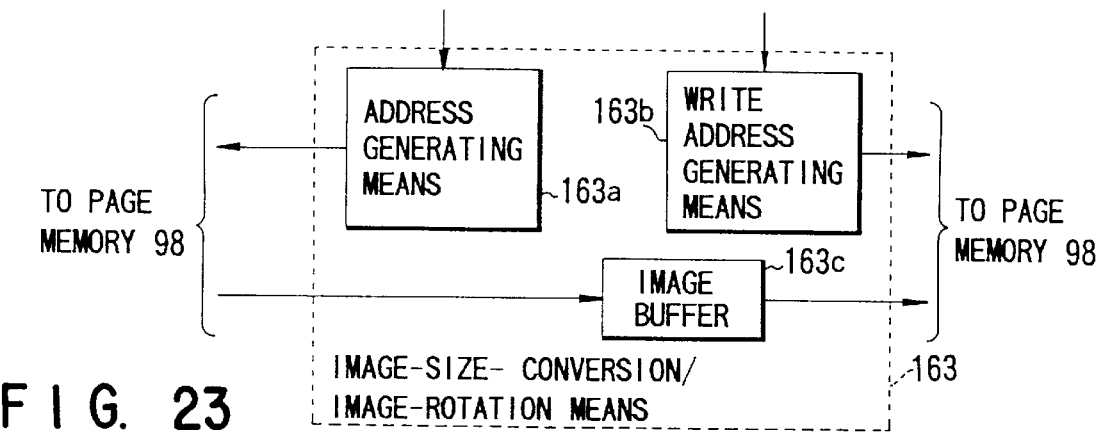
FIGS. 22A and 22B are diagrams showing the relationship of configuration between the original document and the composite image.
FIG. 23 is a block diagram showing the schematic structure of an image size conversion/image rotation means.
FIGS. 24A and 24B are diagrams showing the configuration relationship between the original document and the composite image realized by a conventional structure.

In a case where the direction of the image of original document is lateral as shown in FIG. 22A, the positions of the input images of the four original document sheets in the composite image are as shown in FIG. 22B. That is, the four input image are generally located at the upper left, upper right, lower left and lower right positions in this sequential order.

In an apparatus having a function capable of recording images on the two sides of sheets in the printer section 6, the direction of recording on the right side and that on the reverse side of the sheet are different from each other in accordance with the direction of the original document whether the image is formed longitudinally or laterally. In a case where the original document is a longitudinal document, the directions of images to be recorded on the right side and the reverse side are the same. However, the directions of images to be recorded on the right side and the reverse side are different from each other in a case of the lateral document. That is, the image is sometimes required to be rotated by an angular degree of 180° along the inversion direction of the inversion mechanism section for inverting the recording sheet, on one side of which an image has been recorded. The image position determining means 162 outputs an angle of rotation required in the above-mentioned case.

The image position determining means 162 for outputting the positions of images as described above includes, for example, a CPU which transmits signals indicating the image positions such that upper left is indicated by 0, the upper right is indicated by 1, the lower left is indicated by 2 and the lower right is indicated by 3 and rotational angles.

The image-size-conversion/image-rotation means 163 contracts/rotate images in accordance with the method of copying images. In a case where, for example, two A4-size original document sheets are contracted to copy images on one A4-size original document sheet, the images must be rotated by 90° and the reduction by about 71% (a magnification with which A4 size is halved) in the lengthwise direction is required. In a case where four A4-size original document sheets are contracted to copy images on one A4-size original document sheet, rotation of the images is not required. However, contraction by 50% in the lengthwise direction (a magnification with which A4 is reduced to ¼) must be performed.

If input images are located in a similar sequential order (see FIG. 21B) to that employed when the original document faces side as shown in FIG. 24A, composite images are inadequately located as shown in FIG. 24B. In this case, the four original document sheets must be located in a sequential order as upper right, lower right, upper left and lower left. That is, the configuration must be changed to correspond to the direction of the original document.

As described above, the image-size-conversion/image-rotation means 163 generates the memory address at which the images in the buffer memory region 98a are read in accordance with the method of the copying operation and the configuration determined by the image position determining means 162 to correspond to rotation/reduction of the images. Moreover, the image-size-conversion/image-rotation means 163 generates memory address for writing read images on the image combining region 98b for developing the images.

The image-size-conversion/image-rotation means 163 is structured as shown in FIG. 23. That is, the image-size-conversion/image-rotation means 163 is composed of an address generating means 163a for generating image read address of the buffer memory region 98a in accordance with a copying method signal supplied from the main CPU 91; a write address generating means 163b for generating the image write address for the image combining region 98b in accordance with an image locating signal supplied from the image position determining means 162; and an image buffer 163c for adjusting timing of reading/writing images.

An example of the operation to be performed when A4-size original document sheets are copied by the 4in1 method will now be described.

That is, a user places four sheets of original document D on the original-document tray 8, instructs the 4in1 mode and sheets to which images are copied and depresses the print key 81. As a result, a first sheet of the original document D on the original-document tray 8 is placed on the original-document retainer 12 by the ADF 7 so that the first sheet of the original document D is read by the CCD sensor 34 in the scanner section 4. 8-bit image data read by the CCD sensor 34 is supplied to the image correction section 105 through the CCD driver 103. After images have been corrected by the image correction section 105, image data is supplied to the image processing section 96 through the image data bus 150.

In the image processing section 96, a binary coding operation is performed to covert image data above into 1-bit signals while maintaining the gradient and the sharpness of characters by correcting the ground density of the images, highlighting the edges of the images and correcting the recording density characteristic of the printer section 6. Then, image data is supplied to the image direction detection means 160 and the buffer memory region 98a in the image combination processing section 97a through the image data bus 150.

Also image data of another original document is supplied to the image direction detection means 160 and the buffer memory region 98a in the buffer memory region 98a.

The buffer memory region 98a is composed of a memory having a capacity of about 8 megabytes and capable of storing images of four A4-size original document sheets. Each of the A4-size original document sheets which are read sequentially consists of 3307×4677 pixels. Thus, the amount of data after images have been processed by the image processing section 96 becomes 15,466,839 (=3307×4677) bits. Images, which are sequentially read, are stored in the buffer memory region 98a of the page memory 98 shown in FIG. 4 such that the first sheet is stored from address 0, the second sheet is stored from address 15,466,839, the third sheet is stored from address 30,933,678 and the fourth sheet is stored from address 46,400,517. For example, the first original document has the relationship between each pixel of each original document, which has been read, and the address, as shown in FIG. 4. The most upper left pixel is stored at address 0, the rightmost pixel on the first line is stored at address 3,306, the leftmost pixel on the second line is stored at address 3,307 and the rightmost pixel on the final line is stored at address 15,466,838. As for the addresses of the second and following original documents, the addresses for the second sheet are obtained by adding 15,466,839 to the address of each line for the first sheet, those for the third sheet are obtained by adding 30,933,678 to the same, and those for the fourth sheet are obtained by adding 46,400,517 to the same, the thus-obtained addresses being then stored in the buffer memory region 98a.

As a result of the above-mentioned operation, four A4-size original document sheets are stored in the buffer memory region 98a of the page memory 98.

Then, image data read from the buffer memory region 98a in accordance with the configuration of images determined by the image position determining means 162 is combined and stored in the image combining region 98b by using the addresses supplied from the image-size-conversion/image-rotation means 163.

If all of documents are longitudinal documents, face upwards and written laterally and the sheets are longitudinal sheets, image data of the first sheet is stored in the upper left portion of the image combining region 98b of the page memory 98, that of the second sheet is stored in the upper left portion, that of the third sheet is stored in the lower left portion and that of the fourth sheet is stored in the lower right portion so that a combine image is generated. That is, if longitudinal A4-size original document sheets having all images formed in the longitudinal as shown in FIG. 21A are copied, the configuration of images is determined as shown in FIG. 21B.

As a result, image data items of each document stored in the buffer memory region 98a of the page memory 98 as shown in FIG. 4 are read in a sequential order as first line (1), second line (2), the third line (3), . . . , the final line (18708). The read image data items are, as shown in FIG. 5, stored in the image combining region 98b of the page memory 98.

After the first line of the first sheet has been read, image data in the buffer memory region 98a is stored in the image combining region 98b in the following sequential order: first line of the second sheet, the second line of the first sheet, the second line of the second sheet, . . . , the final line of the first sheet, the final line of the second sheet, the first line of the third sheet, the first line of the fourth sheet, the second line of the third sheet, the second line of the fourth sheet, . . . , the final line of the fourth sheet, and the final line of the fourth sheet.

FIG. 5 shows addresses of pixels in the image combining region 98b. The leftmost pixel on the first line of the first sheet is stored at address 0, the rightmost pixel on the first line of the first sheet is stored at address 3,307 and the leftmost pixel on the first line of the third sheet is stored at address 30,933,678.

As described above, the page memory control section 97 controls addresses to read composite images from the image combining region 98b in the sequential order indicated by numbers put in parentheses. Read image data is supplied to the printer section 6 through the image data bus 150 so that image data is printed.

As described above, when all of documents are longitudinal documents, face upwards and written laterally and the sheets are longitudinal sheets, image data of the first sheet is stored in the upper left portion, that of the second sheet is stored in the upper right portion, that of the third sheet is stored in the lower left portion and that of the fourth sheet is stored in the lower right portion so that a composite image is generated and the composite image is printed by the printer section 6.

When all of documents are longitudinal documents, face downwards and written laterally and the sheets are longitudinal sheets, image data of the first sheet is stored in the lower right portion of the image combining region 98b of the page memory 98, that of the second sheet is stored in the lower left portion, that of the third sheet is stored in the upper right portion and that of the fourth sheet is stored in the upper left portion so that a composite image is generated and the composite image is printed by the printer section 6.

When all of documents are lateral documents, face upwards and written laterally and the sheets are longitudinal sheets, image data in the buffer memory region 98a is rotated by 90° and image data of the first sheet is stored in the upper right portion of the image combining region 98b of the page memory 98, that of the second sheet is stored in the lower right portion, that of the third sheet is stored in the upper left portion and that of the fourth sheet is stored in the lower left portion so that a composite image is generated and the composite image is printed by the printer section 6.

When all of documents are lateral documents, face downwards and written laterally and sheets are longitudinal sheets, image data is rotated by 90° and image data of the firs sheet is stored in the lower left portion, that of the second sheet is stored in the upper left portion, that of the third sheet is stored in the lower right portion and that of the fourth sheet is stored in the upper right portion so that a composite image is generated and the composite image is printed by the printer section 6.

When all of documents are longitudinal documents, face upwards and written longitudinally and sheets are longitudinal sheets, image data of the first sheet is stored in the upper right portion of the image combining region 98b of the page memory 98, that of the second sheet is stored in the upper left portion, that of the third sheet is stored in the lower right portion and that of the fourth sheet is stored in the lower left portion so that a composite image is generated and the composite image is printed by the printer section 6.

When all of documents are longitudinal documents, face downwards and written longitudinally and sheets are longitudinal sheets, image data of the first sheet is stored in the lower left portion of the image combining region 98b of the page memory 98, that of the second sheet is stored in the lower right portion, that of the third sheet is stored in the upper left portion and that of the fourth sheet is stored in the upper right portion so that a composite image is generated and the composite image is printed by the printer section 6.

When all of documents are lateral documents, face upwards and written longitudinally and sheets are longitudinal sheets, image data of the first sheet is stored in the lower right portion of the image combining region 98b of the page memory 98, that of the second sheet is stored in the upper right portion, that of the third sheet is stored in the lower left portion and that of the fourth sheet is stored in the upper left portion so that a composite image is generated and the composite image is printed by the printer section 6.

When all of documents are lateral documents, face downwards and written longitudinally and sheets are longitudinal sheets, image data of the first sheet is stored in the upper left portion of the image combining region 98b of the page memory 98, that of the second sheet is stored in the lower left portion, that of the third sheet is stored in the upper right portion and that of the fourth sheet is stored in the lower right portion so that a composite image is generated and the composite image is printed by the printer section 6.

If lateral documents are mixed with a longitudinal document, mixture of documents is displayed to cause a user to select remaining of the printing operation, restart or alignment of the documents.

If a printing operation while aligning the direction is selected, corresponding image data is read from the buffer memory region 98a of the page memory 98, and then rotated by 90° and contracted by the image processing section 96 followed by storing the same in the image combining region 98b of the page memory 98. Thus, a composite image is generated and the image is printed by the printer section 6.

If original documents facing downwards are mixed, corresponding image data is read from the buffer memory region 98a of the page memory 98, and then rotated by 180° by the image processing section 96 followed by storing the same in the image combining region 98b of the page memory 98. Thus, a composite image is generated and the image is printed by the printer section 6.

If the mode is the 2in1 mode, the original document is a longitudinal document facing upwards and written laterally and sheets are longitudinal sheets, image data is rotated by 90°. Then, image data of the first sheet is stored in the upper portion of the image combining region 98b of the page memory 98 and that of the second sheet is stored in the lower portion so that a composite image is generated and the composite image is printed by the printer section 6.

If the mode is the 2in1 mode, the original document is a longitudinal document facing downwards and written laterally and sheets are longitudinal sheets, image data of the first sheet is stored in the lower portion of the image combining region 98b of the page memory 98 and that of the second sheet is stored in the upper portion so that a composite image is generated and the composite image is printed by the printer section 6.

If the mode is the 2in1 mode, the original document is a lateral document facing downwards and written laterally and sheets are longitudinal sheets, image data of the first sheet is stored in the upper portion of the image combining region 98b of the page memory 98 and that of the second sheet is stored in the lower portion so that a composite image is generated and the composite image is printed by the printer section 6.

If the mode is the 2in1 mode, the original document is a lateral document facing downwards and written laterally and sheets are longitudinal sheets, image data of the first sheet is stored in the lower portion of the image combining region 98b of the page memory 98 and that of the second sheet is stored in the upper portion so that a composite image is generated and the composite image is printed by the printer section 6.

If the mode is the 2in1 mode, the original document is a longitudinal document facing upwards and written longitudinally and sheets are longitudinal sheets, image data of the first sheet is stored in the lower portion of the image combining region 98b of the page memory 98 and that of the second sheet is stored in the upper portion so that a composite image is generated and the composite image is printed by the printer section 6.

If the mode is the 2in1 mode, the original document is a longitudinal document facing downwards and written longitudinally and sheets are longitudinal sheets, image data of the first sheet is stored in the upper portion of the image combining region 98b of the page memory 98 and that of the second sheet is stored in the lower portion so that a composite image is generated and the composite image is printed by the printer section 6.

If the mode is the 2in1 mode and longitudinal and lateral documents are mixed, mixture of the documents is displayed to urge the user to select to remain printing, restart or alignment and printing.

If a printing operation while aligning the direction is selected, corresponding image data is read from the buffer memory region 98a of the page memory 98, and then rotated by 90° and contracted by the image processing section 96 followed by storing the same in the image combining region 98b of the page memory 98. Thus, a composite image is generated and the image is printed by the printer section 6.

If a downward original document is mixed in the case where the mode is the 2in1 mode, corresponding image data is read from the buffer memory region 98a of the page memory 98, and then rotated by 180° and contracted by the image processing section 96 followed by storing the same in the image combining region 98b of the page memory 98. Thus, a composite image is generated and the image is printed by the printer section 6.

A copying operation which is performed when the directions of documents are different from each other will now be described. A case will now be considered in which two A4-size original document sheets are contracted to copy images on one A4-size original document sheet as shown in FIG. 25.

Figure 25A:
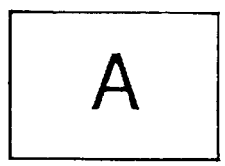
FIGS. 25A to 25D are diagrams showing the relationship of configuration between the original document and the composite image.
Figure 25B:
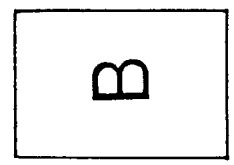
Figure 25C:
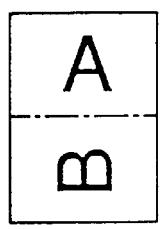
Figure 25D:
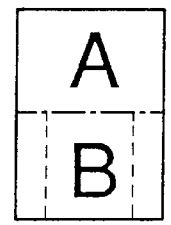

If the original documents have different images respectively formed in the longitudinal direction and the lateral direction as shown in FIGS. 25A and 25B, the positions of the two input images are as shown in FIG. 25C on a composite image with the conventional structure. That is, when the directions of images, which must be combined are different from each other, original document sheet must contracted and located as shown in FIG. 25D. Specifically, original document A having A4-size is contracted to A5 size (reduction ratio of 71%) and its image is rotated by 90°. original document B having A4-size is contracted to A6 size (reduction ratio of 50%) and its image is not rotated.

As described above, the image location determining means 152 comprises the CPU to transmit the positions of images to be located, information about rotation (indicating whether or not the image is rotated) and the reduction ratio.

The image-size-conversion/image-rotation means 163 contracts/rotates the image as described above to be adaptable to the image copying method.

Figure 26:
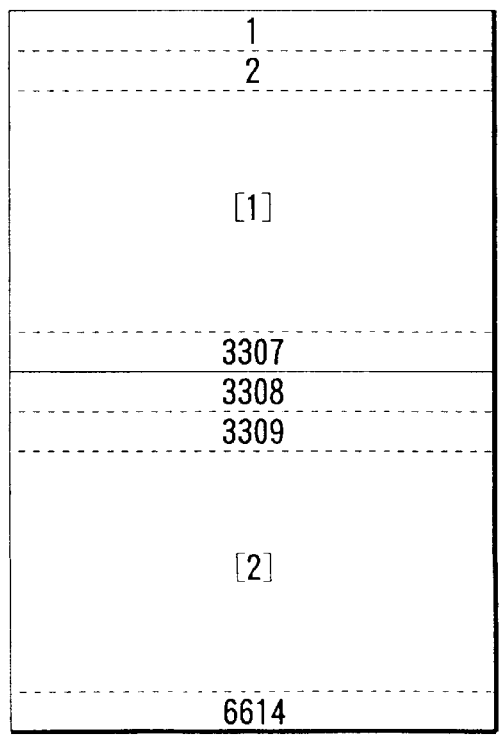
FIG. 26 is a diagram showing an example of stored image data in the buffer memory region.

In a case shown in FIG. 25, the first sheet of the original document is stored from address 0 in the buffer memory region 98a, and the second sheet is stored from address 15,466,839. For example, the first original document has the relationship between each pixel of each original document, which has been read, and the address, as shown in FIG. 26. The most upper left pixel is stored at address 0, the rightmost pixel on the first line is stored at address 4676, the leftmost pixel on the second line is stored at address 4677 and the rightmost pixel on the final line is stored at address 15,466, 838. As for the addresses of the second original document, the addresses for the second sheet are obtained by adding 15,466,839 to the address of each line for the first sheet, the thus-obtained addresses being stored in the buffer memory region 98a.

As a result of the above-mentioned operation, four A4-size original document sheets are stored in the buffer memory region 98a of the page memory 98.

Then, image data read from the buffer memory region 98a in accordance with the configuration of images determined by the image position determining means 162 is combined and stored in the image combining region 98b by using the addresses supplied from the image-size-conversion/image-rotation means 163.

If the directions of the original documents are mixed as shown in FIGS. 25A and 25B, the copied image is as shown in FIG. 25D such that the copied image has a size of longitudinal A4-size and formed images have different sizes but formed in the same direction.

Figure 27:
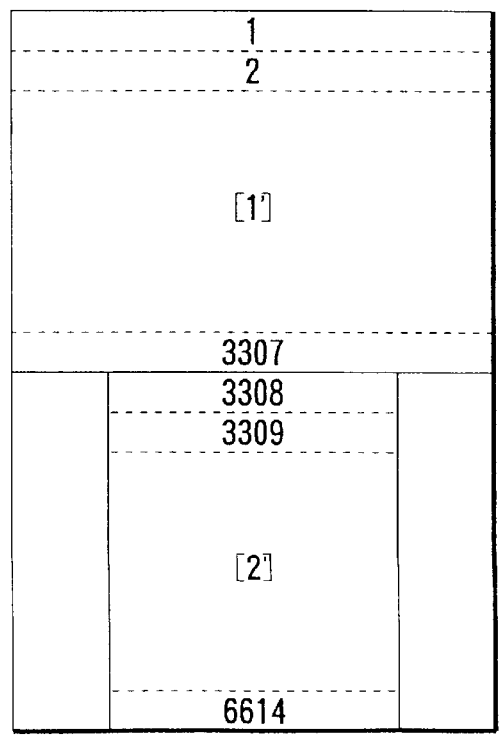
FIG. 27 is a diagram showing an example of stored composite image data in the image combining region.

As a result, image data items of each document stored in the buffer memory region 98a shown in FIG. 26 are read in a sequential order as first line (1), the second line (2), the third line (3), . . . , the final line (6614), as shown in FIG. 26. The read image data items are stored in the image combining region 98b, as shown in FIG. 27. The relationship of the memory addresses to be stored will now be described. To simplify the description, the sheet to be output (to be printed) is made to be a longitudinal A4-size sheet.

Initially, the first line (1), the second line (2), . . . , of the first original document sheet are sequentially read and contracted to 71%. The contracted lines are sequentially stored at memory positions (1), (2), . . . , (addresses respectively start at (0, 3307 and 6614) shown in FIG. 27. As for the second original document, lines at (3308), (3309), . . . , stored in the buffer memory region 98a are sequentially read and respectively contracted to 50%. The contracted lines are sequentially stored at the memory positions (3308), (3309), . . . , shown in FIG. 27.

A process to be performed when the vertical directions of two A4-size original document sheets are different from each other as shown in FIG. 28 and they are contracted and copied to one A4-size original document sheet will now be described.

Figure 28A:
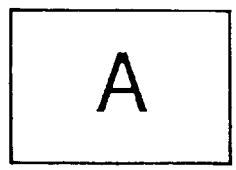
FIGS. 28A to 28D are diagrams showing the relationship of configuration between the original document and the composite image.
Figure 28B:
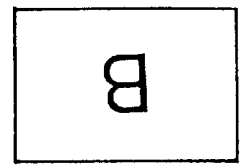
Figure 28C:
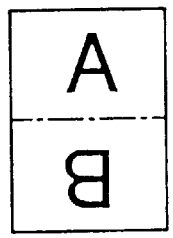
Figure 28D:
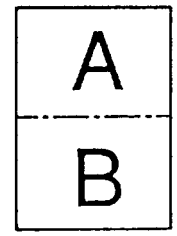

If the vertical directions of the original documents are different as shown in FIGS. 28A and 28B, configuration is made as shown in FIG. 28C by the conventional method without consideration of the direction. If the vertical direction of the images to be combined are mixed, the image must be rotated so as to be located as shown in FIG. 28D. That is, original document B must be rotated by 180° before it is located.

Figure 29:
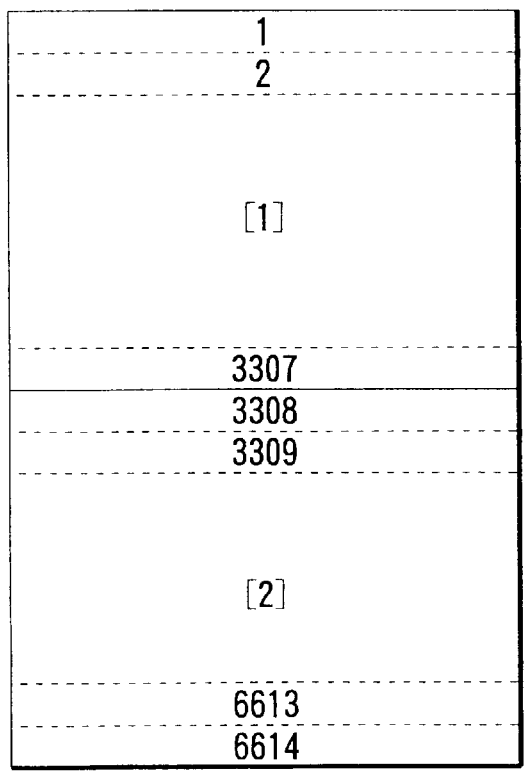
FIG. 29 is a diagram showing an example of stored image data in the buffer memory region.
Figure 30:
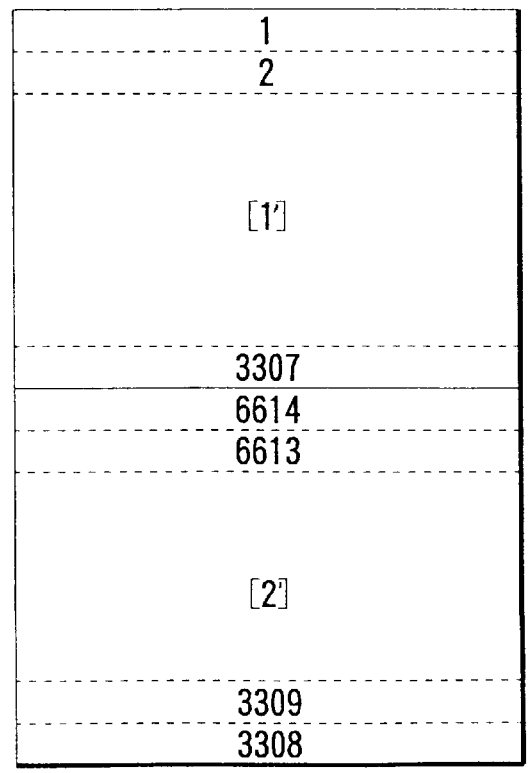
FIG. 30 is a diagram showing an example of stored composite image data in the image combining region.

Images are stored at the addresses of the buffer memory region 98a shown in FIG. 29. The images are stored at positions in the image combining region 98b shown in FIG. 30. That is, lines of the second original document stored at (3307), (3308), . . . , in the buffer memory region 98a are sequentially read and respectively are contracted to 71%. The contracted lines are sequentially stored at the memory positions (3308), (3309), . . . , shown in FIG. 30.

A process which is performed when an original document having an image on one side thereof is copied to two sides of a sheet will now be described.

Figure 31A:
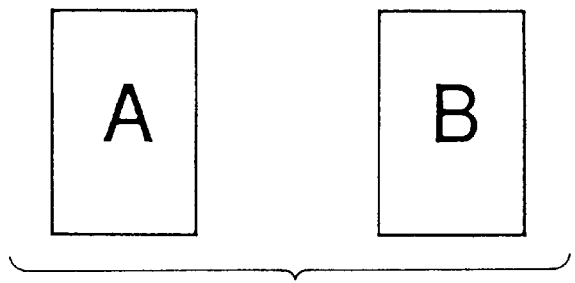
FIGS. 31A to 31E are diagrams showing the relationship of configuration between the original document and the copied image.
Figure 31B:
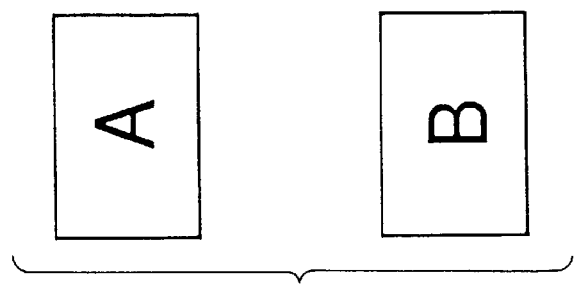
Figure 31C:
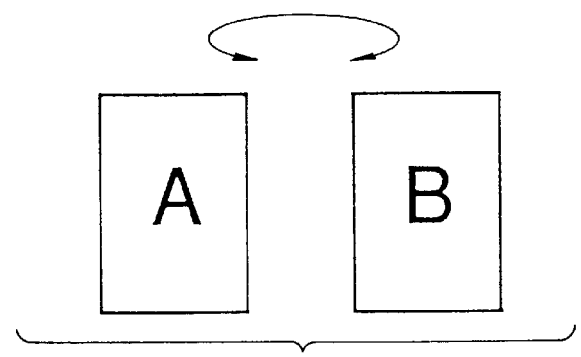
Figure 31D:
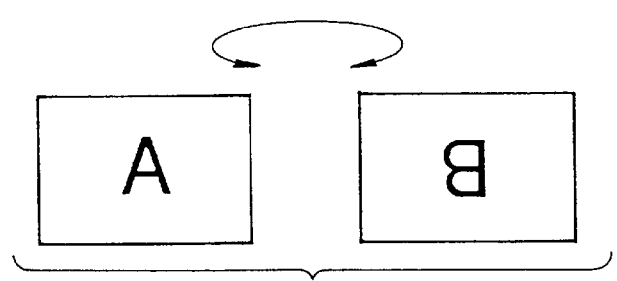
Figure 31E:
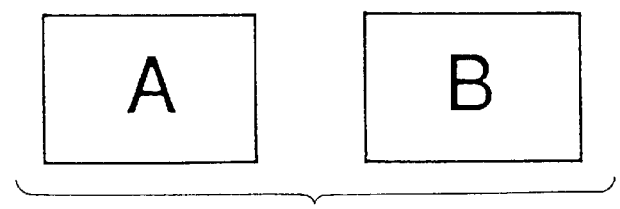

If two longitudinal original document sheets are copied on the two sides of a sheet as shown in FIG. 31A, the images must be located as shown in FIG. 31C. In a case of lateral original documents as shown in FIG. 31B are copied, located images are turned up side down as shown in FIG. 31D if the same configuration (see FIG. 31C) as that employed in the case of the longitudinal original document. That is, the adequate image direction is different between the longitudinal original document and the lateral original document when the images are copied on the two sides. Specifically, in the case of the lateral original document, either of the first sheet or the second sheet must be rotated by 180°.

As for the specific memory configuration in the page memory 98, lines of the second original document sheet stored at (3308), (3309), . . . , of the buffer memory region 98a are sequentially read and respectively contracted to 71%. Reduced lines are stored at the memory positions (3308), (3309) in the image combining region 98b, as shown in FIG. 32.

A case where an original document sheet, on the two sides of which images are formed, is contracted and output on either side of one sheet (2in1) will now be considered. When an original document having images on the two side thereof as shown in FIG. 33 is output, located images are turned upside down as shown in FIG. 34A if the images are not located adequately. In this case, the directions of images on the two sides of the input original document must be determined to adequately locate images, as shown in FIG. 34B.

A process will now be described in which original documents each having images on the two sides are copied by a Nin1 method. A case will now be described in which original documents each having images on the two sides thereof and original documents each having an image on one side thereof are copied.

When there original document sheets shown in FIG. 35 are output by the 4in1 method, images are located as shown in FIGS. 36A and 36B if the images are located similarly to the case of the original document having images on the two sides thereof because the first original document has images on the two sides thereof and each of the second and third original documents has an image on one side thereof. Although the output can be made on one sheet as shown in FIG. 36C, images are output on two sheets and positions of D, B and F shown in FIG. 36A are made to be blank portions. That is, a determination whether the read original document is an original document having images on the two sides thereof or an original document having an image on one side thereof must be performed and copy of the reverse side (white paper) of the original document having an image on one side thereof must be inhibited.

Figure 37:
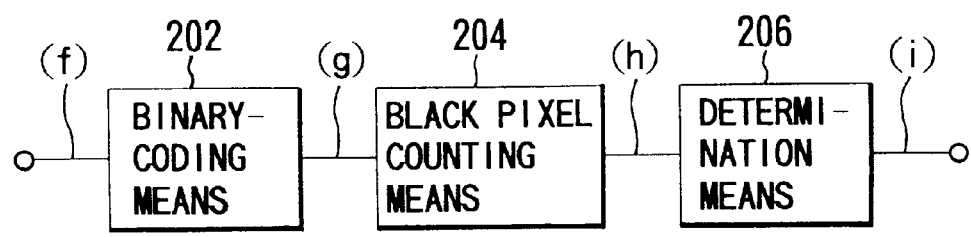
FIG. 37 is a block diagram showing the structure of a white paper determination means.

FIG. 37 shows an example of the structure of a white paper determination means for determining whether or not the read image is a white paper. The operation will now be described.

The white paper determination means is composed of a binary-coding means 202, a black-pixel determination means 204 and a determination means 206. Image data (f) read by the scanner section 4 is supplied to the binary-coding means 202 so that it is binary-coded under the following conditions. Thus, binary-coded signal (g) is transmitted.

$g=0: f>TH0$ $g=1: f \leq TH0$ where the case where g=1 means that the subject pixel is a black pixel.

Figure 38:
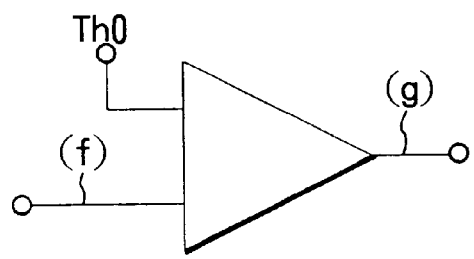
FIG. 38 is an equivalent circuit diagram showing the binary-coding means shown in FIG. 37.
Figure 39:
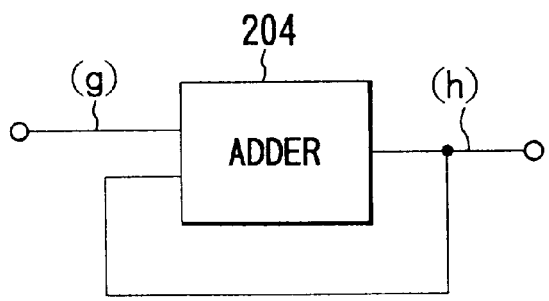
FIG. 39 is an equivalent circuit diagram showing the structure of a black pixel counting means shown in FIG. 37.

FIG. 38 is a circuit diagram of the binary-coding means 202. The black-pixel count means 204 counts the number of black pixels in response to the binary-coded signal (g). The black-pixel count means 204 comprises an adder as shown in FIG. 39 to add the binary-coded signals (g) so as to transmit a count signal (h).

Figure 40:
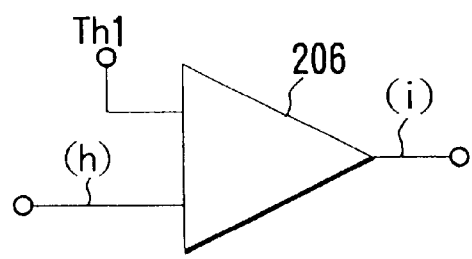
FIG. 40 is an equivalent circuit diagram showing the structure of the determination means shown in FIG. 37.

The determination means 206 is formed into a threshold value processing circuit as shown in FIG. 40 to subject the count signal (h) and threshold value Th1 to perform the following determination:

White Paper: h<Th1

Non-White Paper: h≧Th1

Thus, whether the read original document is an original document having images on the two sides thereof or an original document having an image on one side thereof can be determined.

Although the process for copying an original document having an image on one side thereof is copied to the two sides of a sheet has been described, a stapling position causes the adequate image location to be different when stapling process is performed in which a plurality of copied sheets are stapled.

When two original document sheets as shown in FIG. 41 are copied to the two sides of a sheet, the vertical configuration of images becomes different between a case where the upper left portion is stapled as shown in FIG. 42 and a case where the upper left portion is stapled as shown in FIG. 43. The stapling position must be previously instructed and the direction of the original document must be determined to be adaptable to the instructed position so as to adequately locate the images.

As described above, when the function of contracting a plurality of original document sheets to combine and output the images onto one sheet or a double-side output function is used by the conventional copying machine, a required copy cannot be obtained in many cases attributable to the direction of the original document whether the image is formed in the longitudinal direction or the lateral direction and the direction of the paper sheet cassette. Erroneous use of the above-mentioned function provided for the purpose of improving the appearance of the copy and reducing the quantity of copying sheets raises a problem of inconvenience for a user or increase in the quantity of paper attributable to the required re-copying operation. However, the present invention enables an image processing apparatus to be provided which is capable of forming a required copy regardless of the direction of the original document set by a user and the direction of the set original document.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:

an original-document retainer on which an original document is placed;

reading means for reading an image of the original document placed on the original-document retainer by optically scanning the image in a main scanning direction and a sub-scanning direction, which is perpendicular to the main scanning direction;

image forming means for forming an image on an image forming medium on the basis of the image of the original document read by the reading means, the image forming medium having first to fourth regions determined by dividing the image forming medium into four equal regions, wherein when the image forming medium is placed on the original-document retainer with one side of the image forming medium parallel to the main scanning direction, the first region is defined as one of the divided four regions, the second region is defined as a region adjacent in the main scanning direction to the first region, the third region is defined as a region adjacent in the sub-scanning direction to the first region, and the fourth region is defined as a region adjacent in the sub-scanning direction to the second region and also adjacent in the main scanning region to the third region;

determining means for determining a structure of the image of the original document read by the reading means; and combining means for combining the first to fourth original images sequentially read by the reading means into one composite image on the image forming medium, said combining means positioning the first to fourth original images on the image forming medium selectively in accordance with either one of a first configuration and a second configuration, on the basis of determining results obtained by the determining means, wherein in said first configuration, the first, second, third, and fourth original images are positioned in the first, second, third, and fourth regions, respectively, and, in said second configuration, the first, second, third and fourth original images are positioned in the third, first, fourth and second regions, respectively;

wherein the image forming means forms the image on the image forming medium on the basis of the images combined by the combining means.

2. An apparatus according to claim 1, wherein the image forming medium and the original document each have two pairs of sides of different lengths that are perpendicular to each other, and when the determining means determines that the first to fourth original images sequentially read by the reading means are in a landscape orientation where strings of characters are arranged in a direction of a longer side of the original document, the first to fourth original images are positioned in accordance with the second configuration.

3. An image forming apparatus comprising:

reading means for reading an original document and providing an original image;

detecting means for detecting an orientation and a size of the original image read by the reading means and determining whether the original image is in a portrait orientation or a landscape orientation;

arrangement determining means for, when the detecting means detects that first to fourth original images sequentially read by the reading means are all in the portrait orientation, aligning the first and second original images in a direction of a shorter side of an image forming medium having a rectangular shape and also the third and fourth original images in the direction of the shorter side of the image forming medium, and when the detecting means detects that the first to fourth original images are all in the landscape orientation, aligning the first and second original images in a direction of a longer side of the image forming medium and also the third and fourth original images in the direction of the longer side of the image forming medium;

size changing means for changing a total size of the original images positioned by the arrangement determining means in accordance with a size of the image forming medium and for providing a composite image; and forming means for forming an image corresponding to the composite image provided by the size changing means onto the image forming medium.

4. An apparatus according to claim 3, wherein the detecting means detects the orientation of the original image on the basis of an arrangement of characters in the original image.

5. An apparatus according to claim 3, wherein the arrangement determining means arranges the first to fourth original images in an upper-left, an upper-right, a lower-left and a lower-right region, respectively, of the image forming medium placed in the landscape orientation, when the first to fourth original images are all in the landscape orientation with the top portions thereof all being faced in an upward direction.

6. An apparatus according to claim 3, wherein the arrangement determining means arranges the first to fourth original images in a lower-right, a lower-left, an upper-right, and an upper-left region, respectively, of the image forming medium which is placed in the landscape orientation, when the first to fourth original images are all in the landscape orientation with top portions thereof all being faced in a downward direction.

7. A method for forming an image comprising the steps of:

reading an image of an original document placed on an original-document retainer by optically scanning the image in a main scanning direction and a sub-scanning direction, which is perpendicular to the main scanning direction;

forming an image on an image forming medium on the basis of the image of the original document read at the reading step, wherein the image forming medium has first to fourth regions defined by dividing the image forming medium into four equal regions, and when the image forming medium is placed on the original-document retainer with one first region is defined as one of the divided four regions, the second region is defined as a region adjacent in the main scanning direction to the first region, the third region is defined as a region adjacent in the sub-scanning direction to the first region, and the fourth region is defined as a region adjacent in the sub-scanning direction to the second region and also adjacent in the main scanning direction to the third region;

determining a structure of the image of the original document read at the reading step; and combining the first to fourth original images sequentially read at the reading step into one composite image on the image forming medium by positioning the first to fourth original images on the image forming medium selectively in accordance with either one of a first configuration and a second configuration on the basis of determining results obtained at the determining step, wherein in the first configuration, the first, second, third and fourth original images are positioned in the first, second, third and fourth regions, respectively, and, in the second configuration, the first, second, third and fourth original images are positioned in the third, first, fourth and second regions, respectively, and wherein the image is formed on the image forming medium at the image forming step on the basis of the images combined at the combining step.

8. A method according to claim 7, wherein both the image forming medium and the original document have two pairs of sides of different lengths that are perpendicular to each other, and when the first to fourth original images sequentially out at the reading step are detected at the determining step as being in a landscape orientation where strings of characters are arranged in a direction of a longer side of the original document, the first to fourth original images are positioned in accordance with the second configuration.

9. A method for forming an image comprising the steps of:

reading an original document and providing an original image;

detecting an orientation and size of the original image read at the reading step and determining whether the original image is in a portrait orientation or in a landscape orientation;

aligning first and second original images in a direction of a shorter side of an image forming medium having a rectangular shape and third and fourth original images in the direction of the shorter side of the image forming medium when the first to fourth original images sequentially read at the reading step are all detected at the detecting step as being in the portrait orientation, and aligning the first and second original images in a direction of a longer side of the image forming medium and also the third and fourth original images in the direction of the longer side of the image forming medium when the first to fourth original images are all detected as being in the landscape orientation;

changing a total size of the original images aligned at the aligning step in accordance with a size of the image forming medium and providing a composite image; and forming an image corresponding to the composite image provided at the size changing step onto the image forming medium.

10. A method according to claim 9, wherein the orientation of the original image is detected at the detecting step on the basis of an arrangement of characters in the original image.

11. A method according to claim 9, wherein the first to fourth original images are arranged at the aligning step in an upper-left, an upper-right, a lower-left and a lower-right region, respectively, of the image forming medium placed in the landscape orientation when the first to fourth original images are all in the landscape orientation with the top portions thereof all facing in an upward direction.

12. A method according to claim 9, wherein the first to fourth original images are arranged at the aligning step in a lower-right, a lower-left, an upper-right and an upper-left region, respectively, of the image forming medium placed in the landscape orientation when the first to fourth original images are all in the landscape orientation with the top portions thereof all facing in a downward direction.

* * * * *